United States Patent
Ahn

(10) Patent No.: US 8,264,652 B2
(45) Date of Patent: Sep. 11, 2012

(54) LIQUID CRYSTAL DISPLAY DEVICE WITH A DATA LINK CONNECTING A DATA PAD AND DATA LINE

(75) Inventor: Byung Chul Ahn, Ahnyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/768,321

(22) Filed: Apr. 27, 2010

(65) Prior Publication Data

US 2010/0208154 A1 Aug. 19, 2010

Related U.S. Application Data

(62) Division of application No. 11/312,715, filed on Dec. 21, 2005, now Pat. No. 7,733,453.

(30) Foreign Application Priority Data

Dec. 31, 2004 (KR) ................................ 2004-118570

(51) Int. Cl.
*G02F 1/1343* (2006.01)
*G02F 2/1345* (2006.01)

(52) U.S. Cl. ......... 349/141; 349/147; 349/149; 349/152

(58) Field of Classification Search .................. 349/141, 349/147, 149–152
See application file for complete search history.

(56) References Cited

U.S. PATENT DOCUMENTS

| | | | |
|---|---|---|---|
| 6,323,051 B1 | 11/2001 | Shimada | |
| 6,411,358 B2 | 6/2002 | Song et al. | |
| 6,624,446 B2 * | 9/2003 | Kim | 257/72 |
| 6,741,312 B2 * | 5/2004 | Komatsu | 349/141 |
| 7,889,306 B1 * | 2/2011 | Ko et al. | 349/153 |
| 2001/0005238 A1 * | 6/2001 | Yun et al. | 349/43 |
| 2001/0007779 A1 * | 7/2001 | Lee et al. | 438/30 |
| 2001/0048500 A1 | 12/2001 | Lim et al. | |
| 2002/0071086 A1 * | 6/2002 | Kim et al. | 349/152 |
| 2002/0130324 A1 | 9/2002 | Song et al. | |
| 2003/0071955 A1 * | 4/2003 | Nakayoshi et al. | 349/154 |
| 2003/0122982 A1 * | 7/2003 | Shin et al. | 349/43 |
| 2004/0119928 A1 | 6/2004 | Niwano et al. | |
| 2004/0135955 A1 * | 7/2004 | Hong | 349/141 |
| 2005/0078246 A1 | 4/2005 | Yoo et al. | |

FOREIGN PATENT DOCUMENTS

| | | | |
|---|---|---|---|
| KR | 1999-0031218 A | | 5/1999 |
| KR | 2000-0074548 | * | 12/2000 |
| KR | 2001-0063293 A | | 7/2001 |

* cited by examiner

*Primary Examiner* — Jessica M Merlin

(74) *Attorney, Agent, or Firm* — McKenna Long & Aldridge LLP

(57) ABSTRACT

A fringe field switching thin film transistor substrate includes a gate electrode connected to the gate line, a source electrode connected to the data line, a drain electrode opposed to the pixel electrode and a semiconductor layer defining a channel between the source electrode and the drain electrode. A common electrode extends from the common line into the pixel area. A pixel electrode extends from the drain electrode into the pixel area overlapping the common electrode with the gate insulating film. The gate line and the common line are formed from a first conductive layer group having double conductive layers, and the common electrode is formed by an extension of the lowermost layer of the common line. The data line, the source electrode and the drain electrode are formed of a second conductive layer group having double conductive layers.

10 Claims, 27 Drawing Sheets

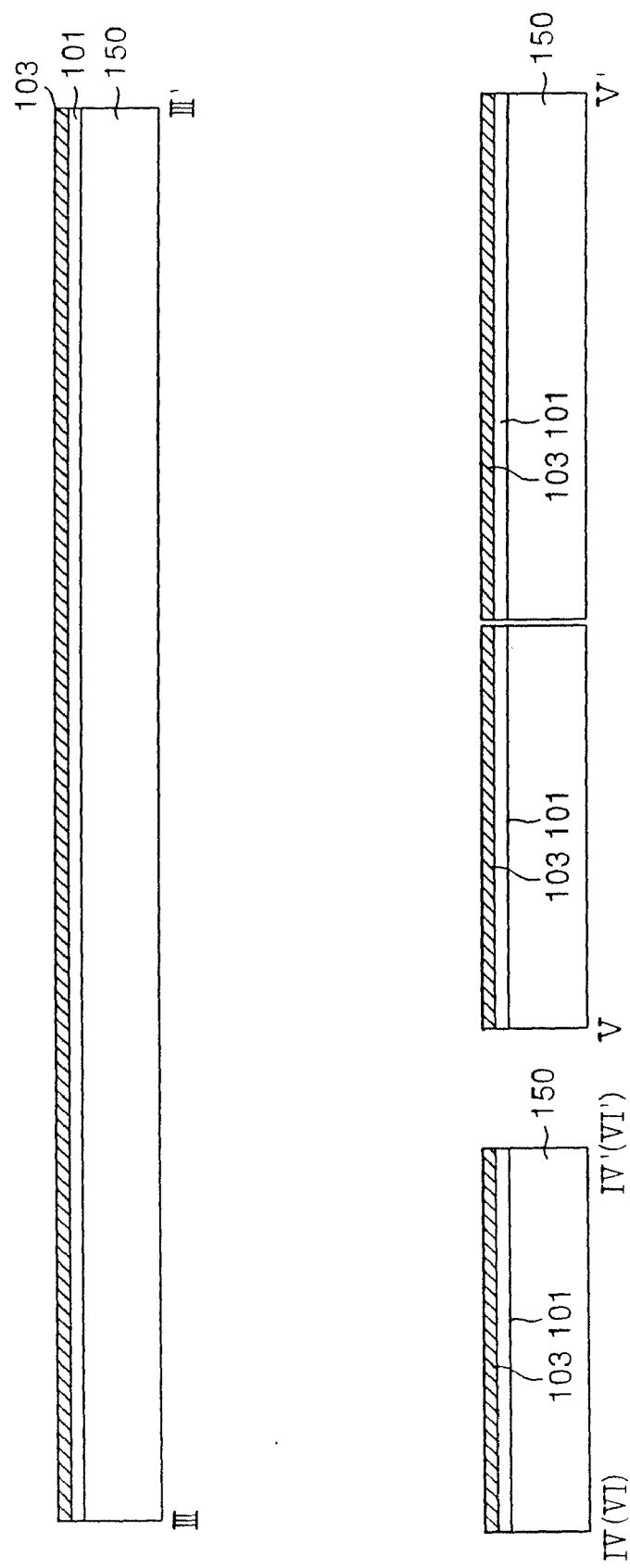

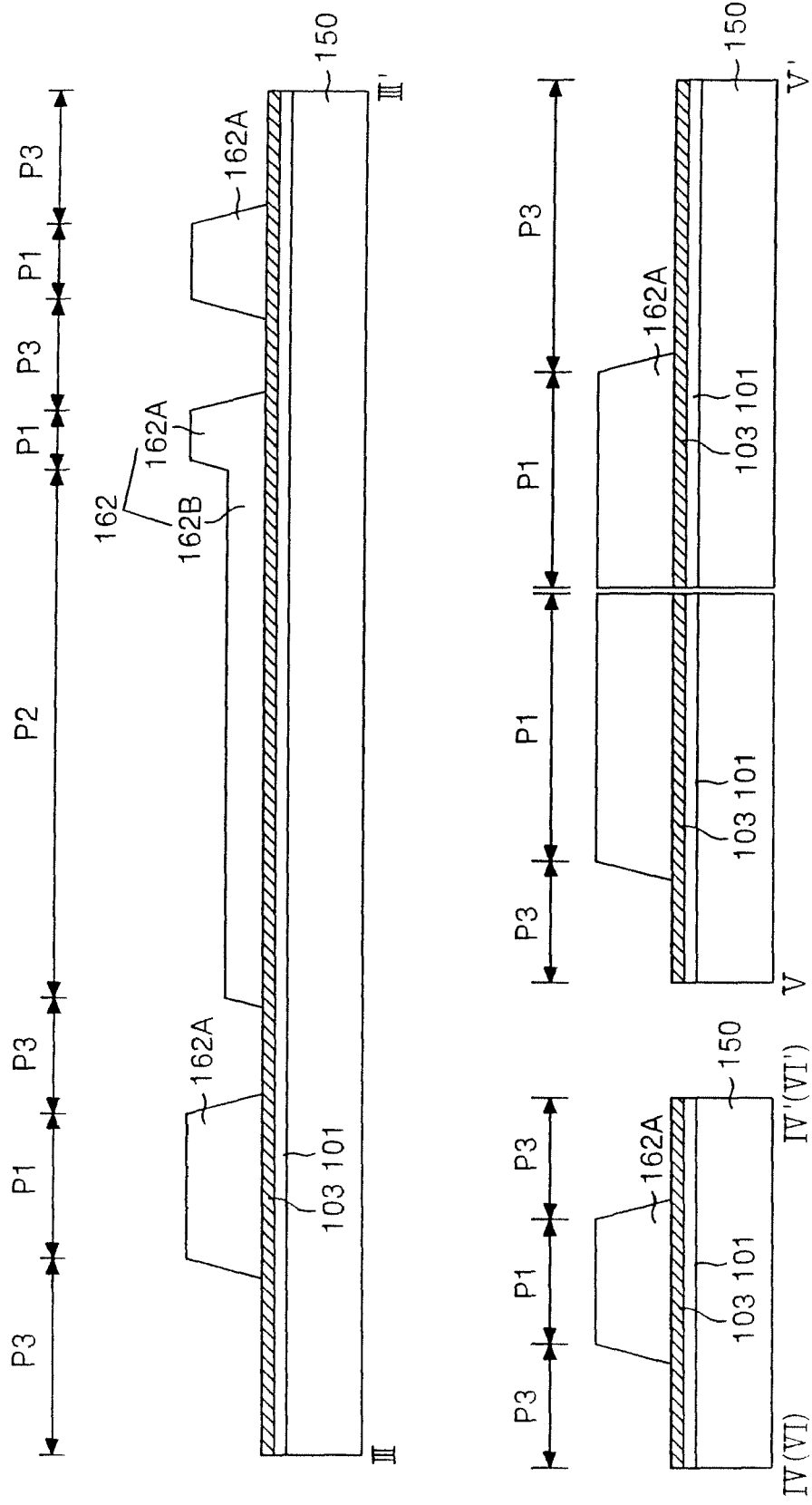

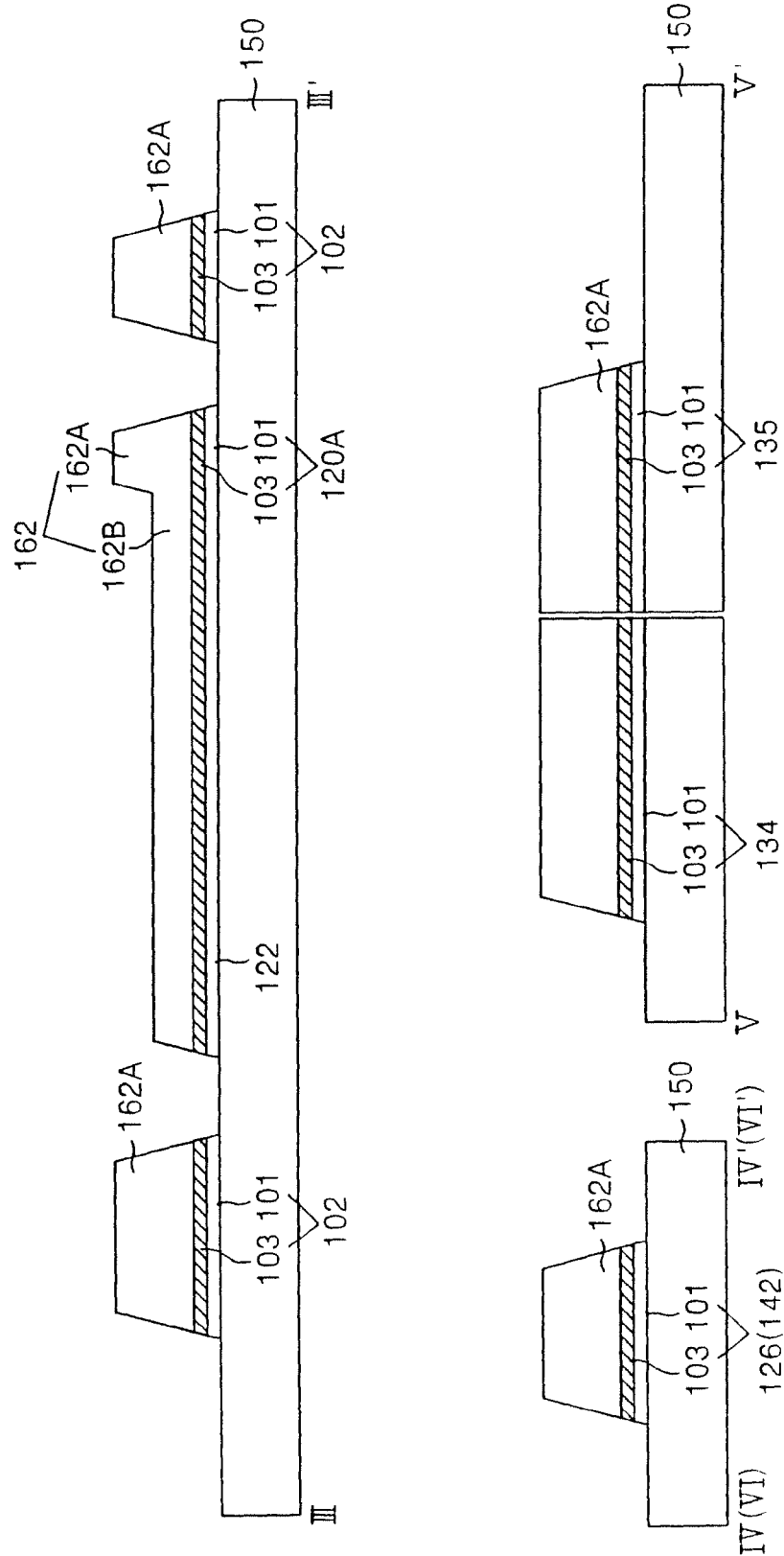

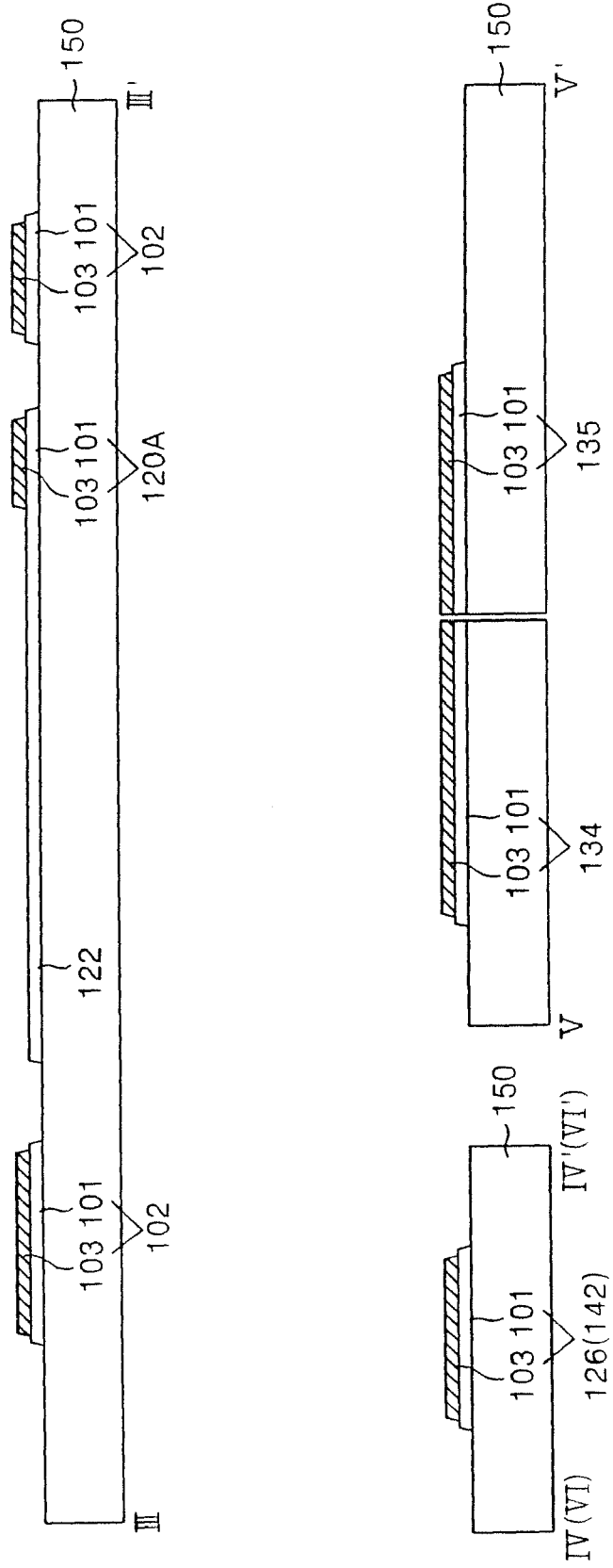

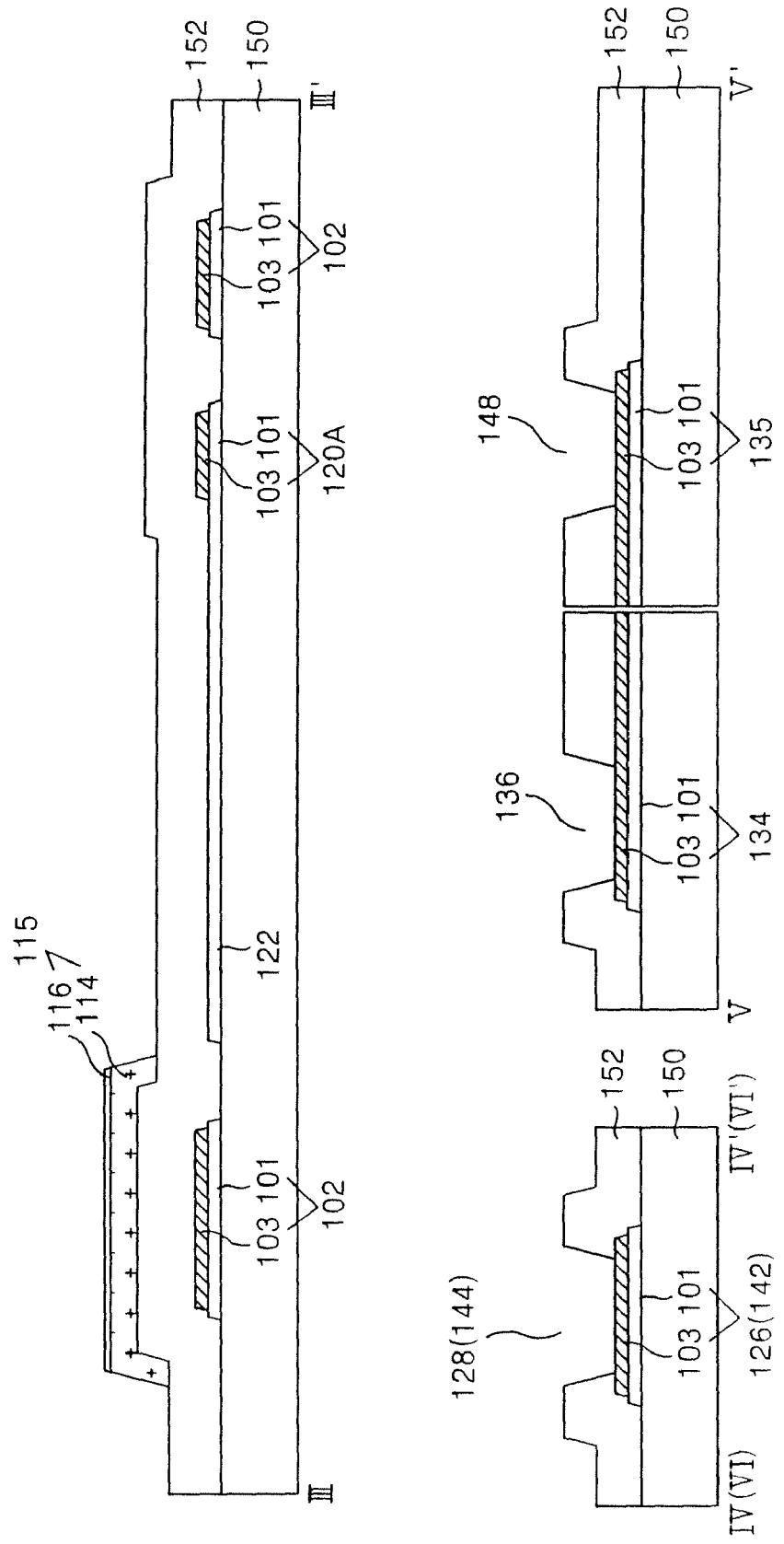

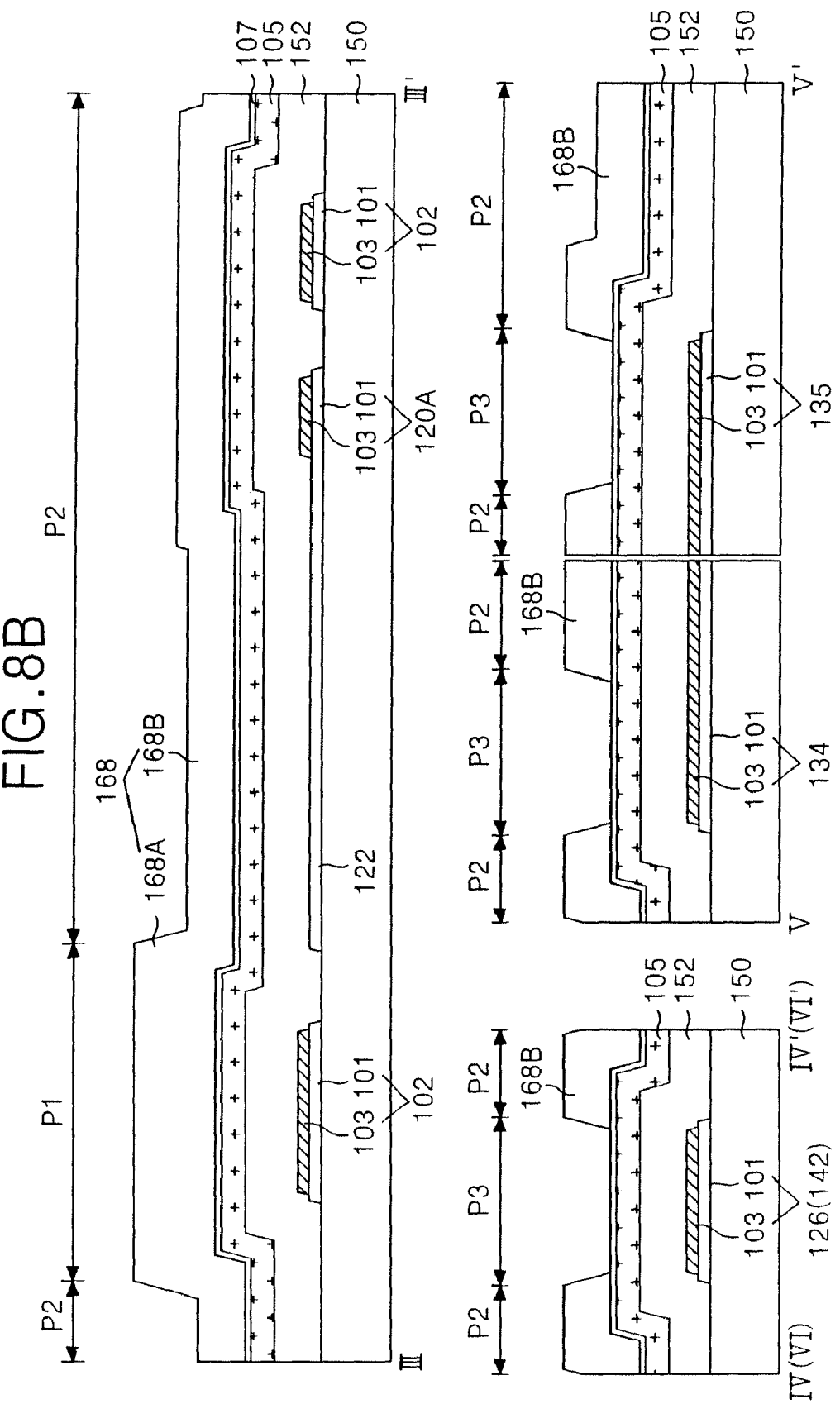

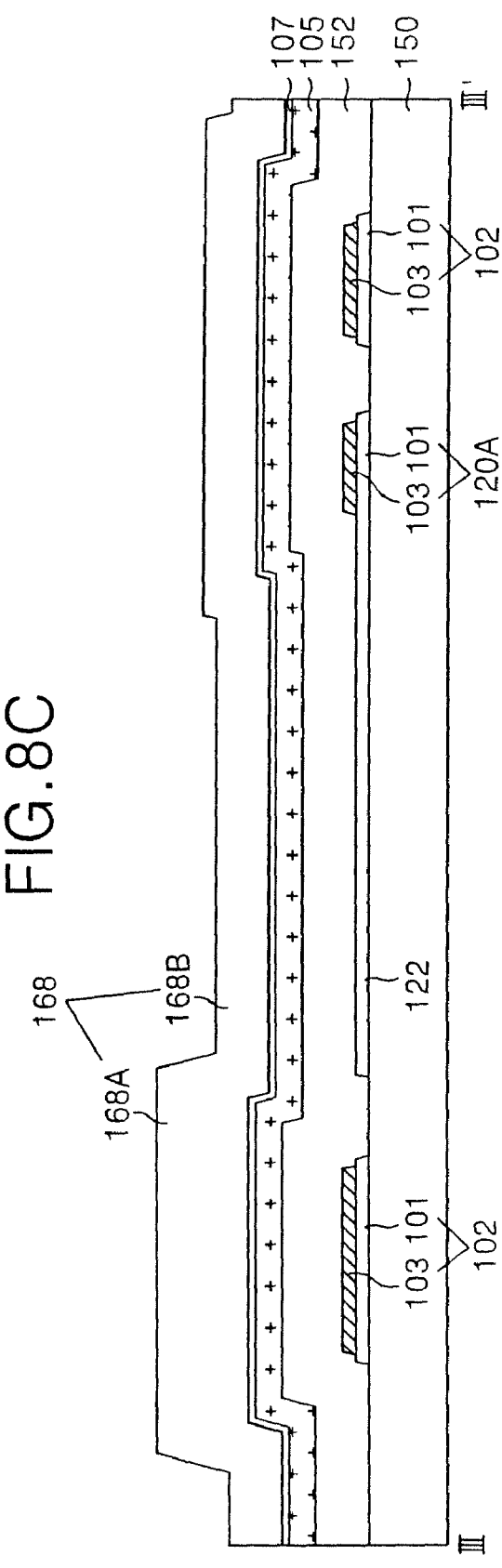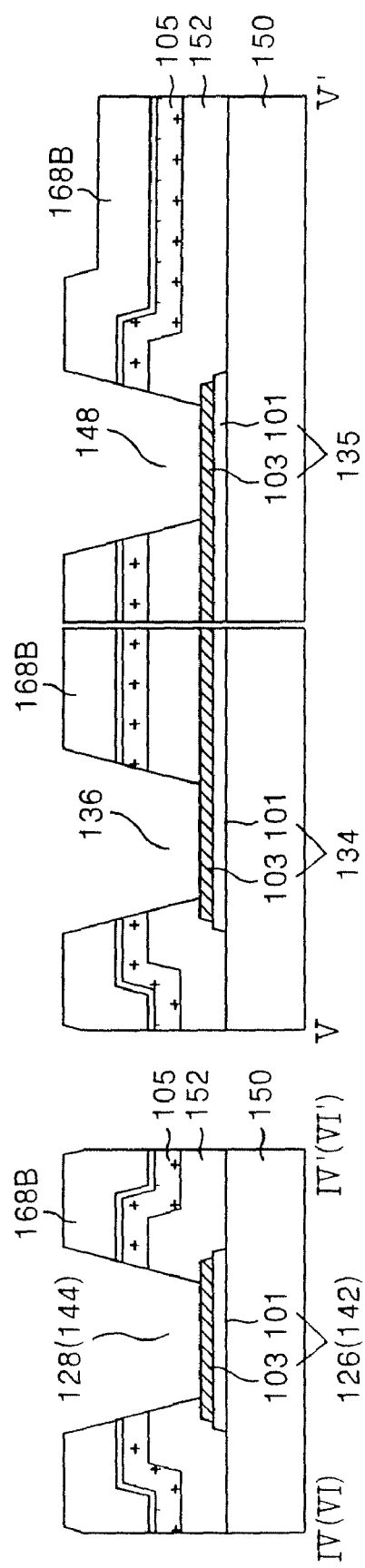

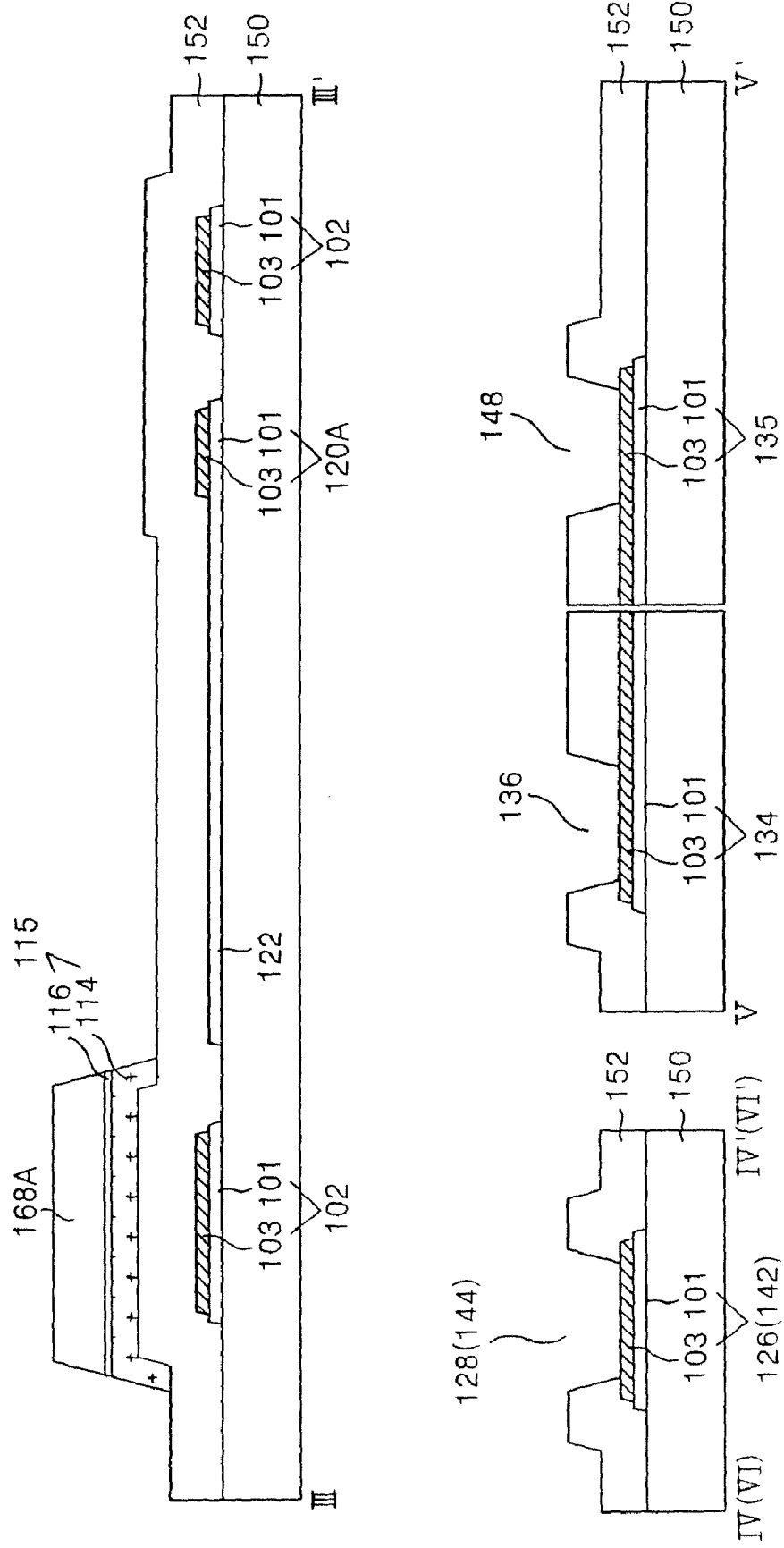

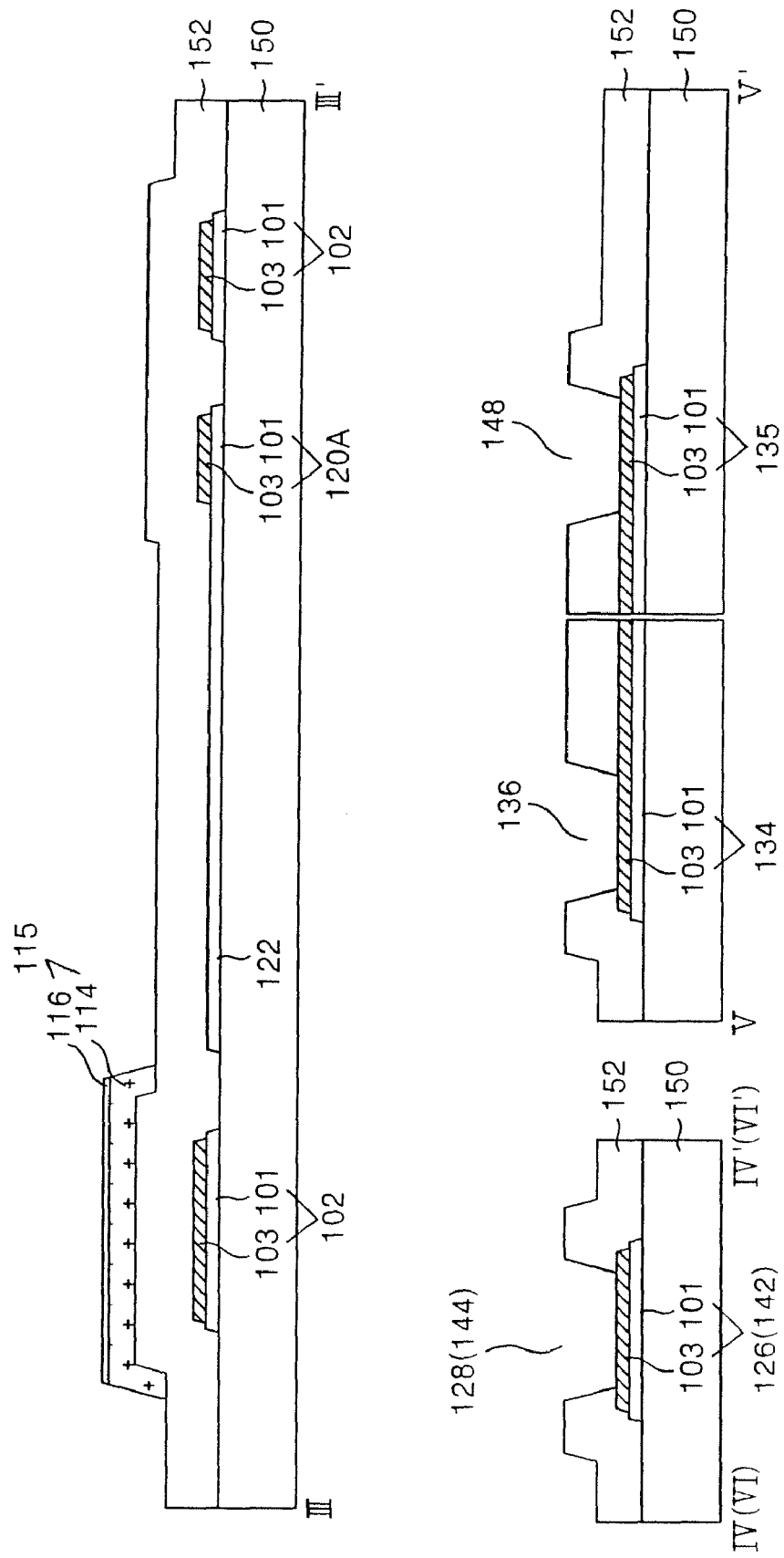

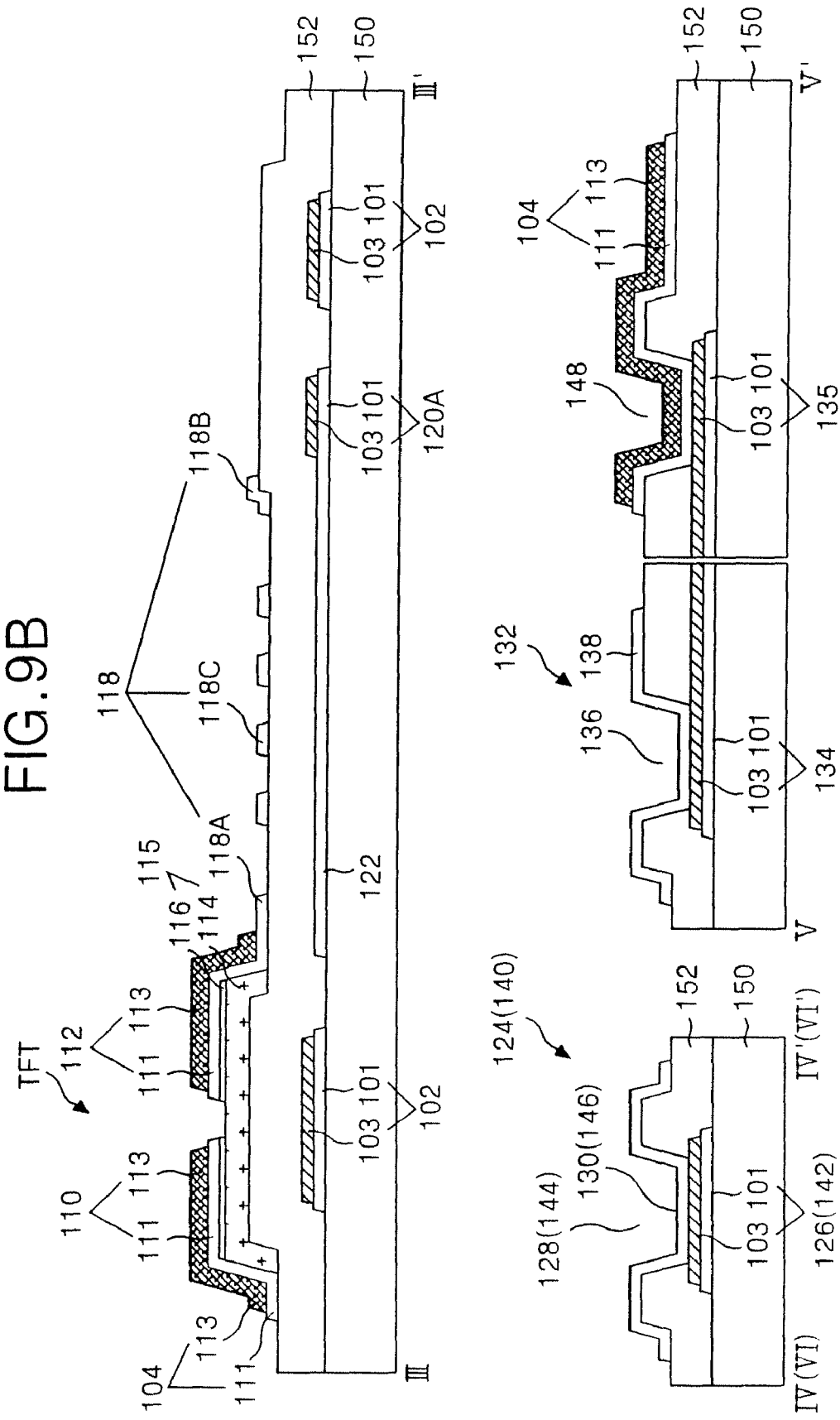

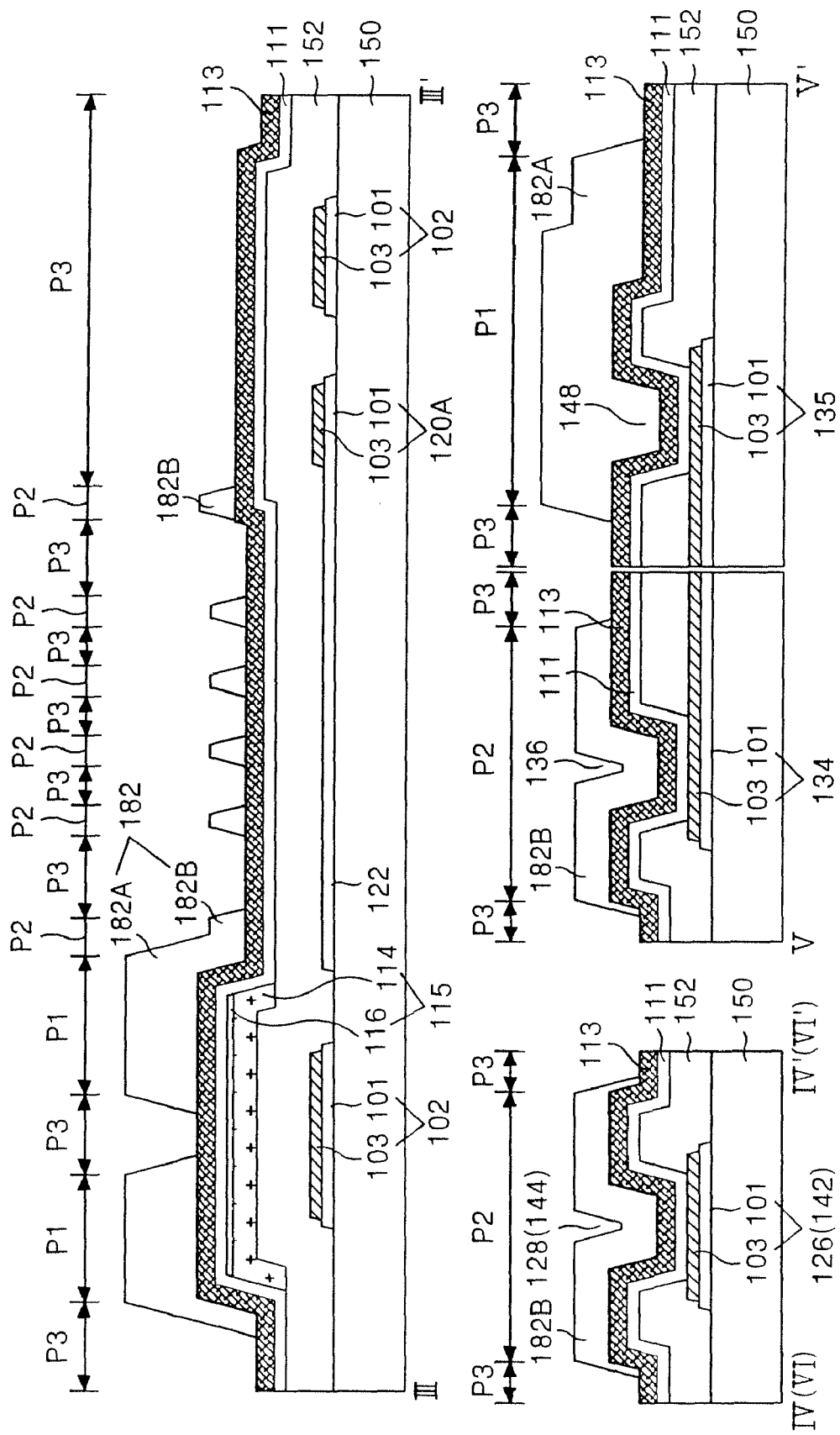

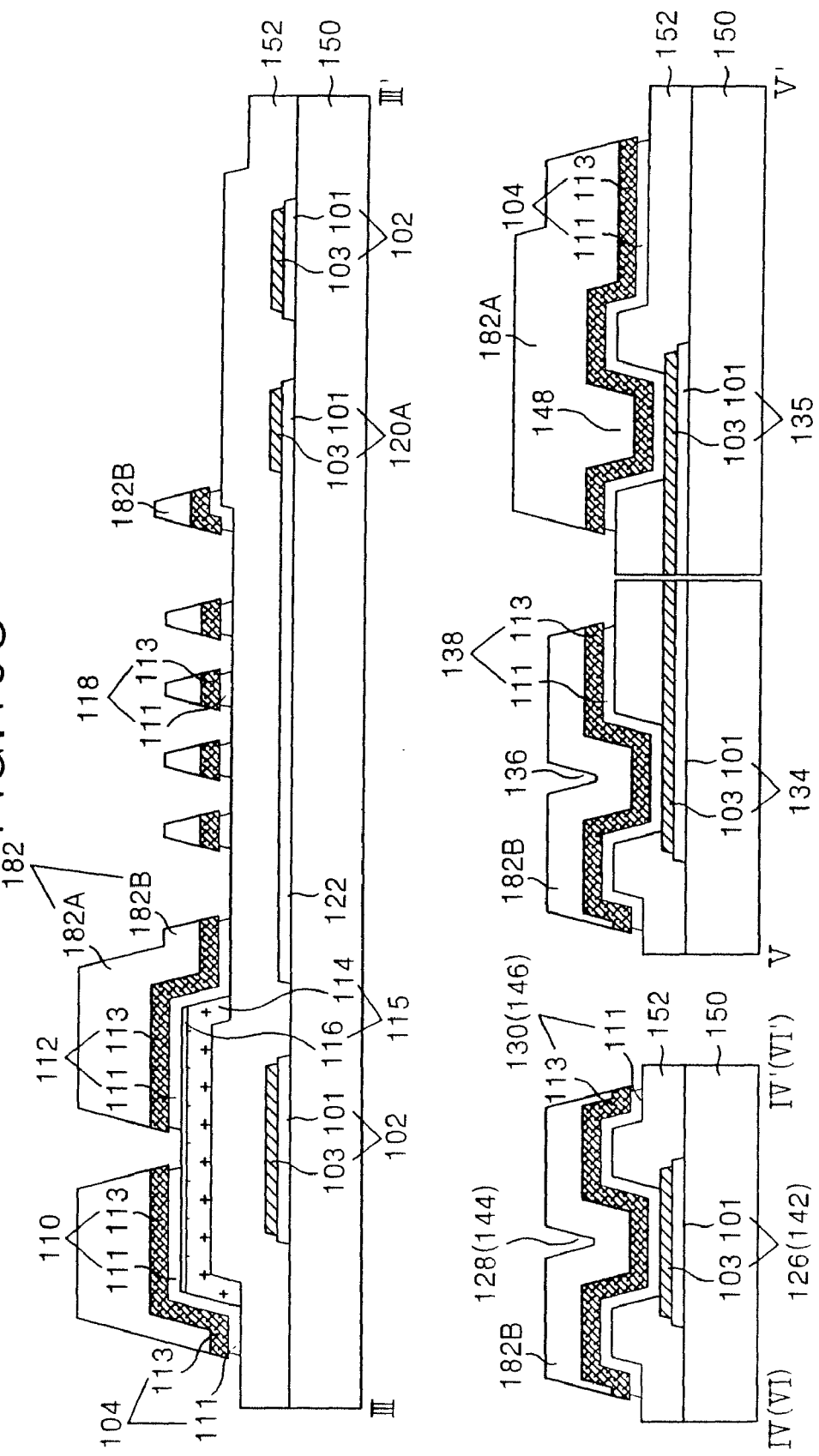

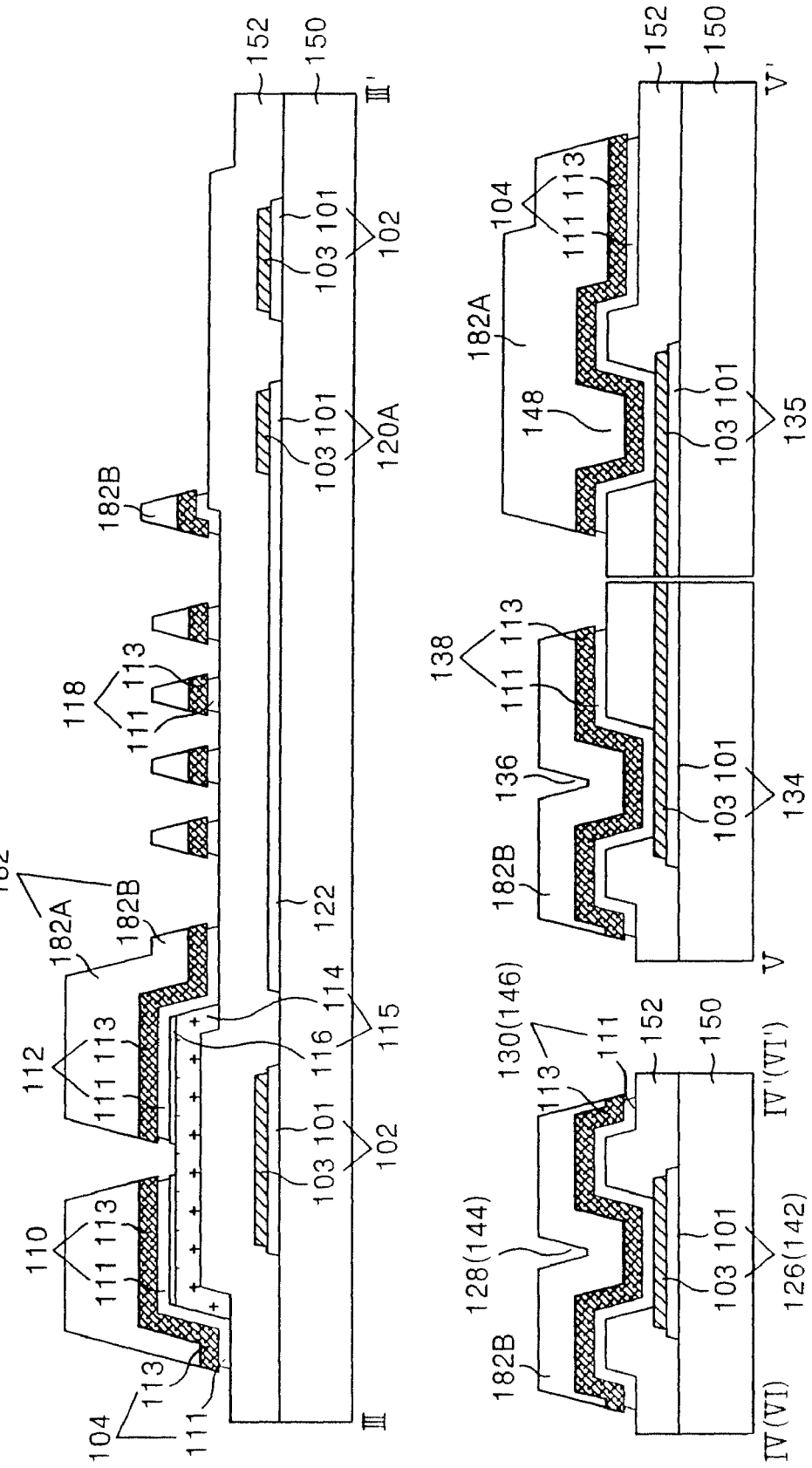

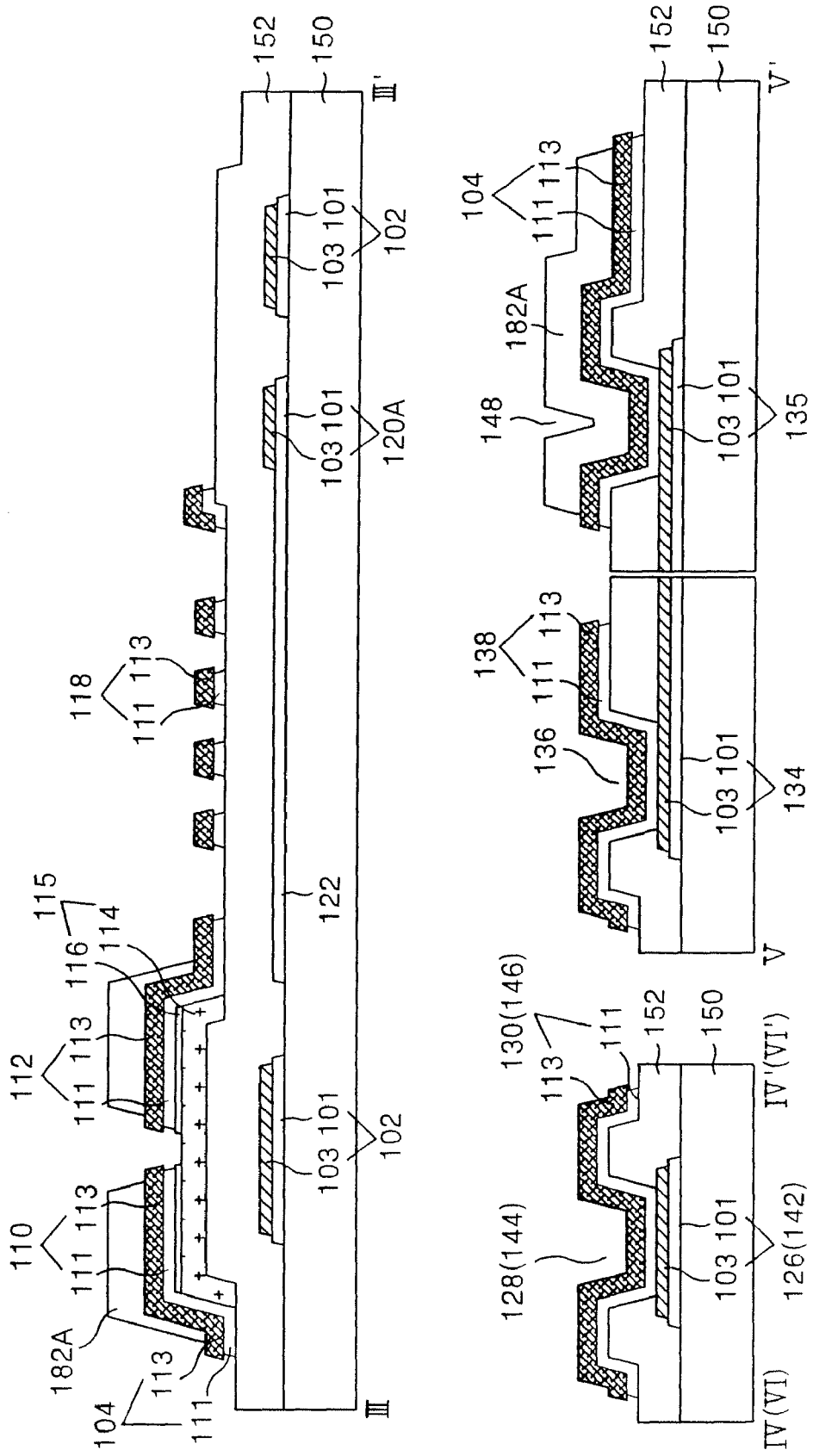

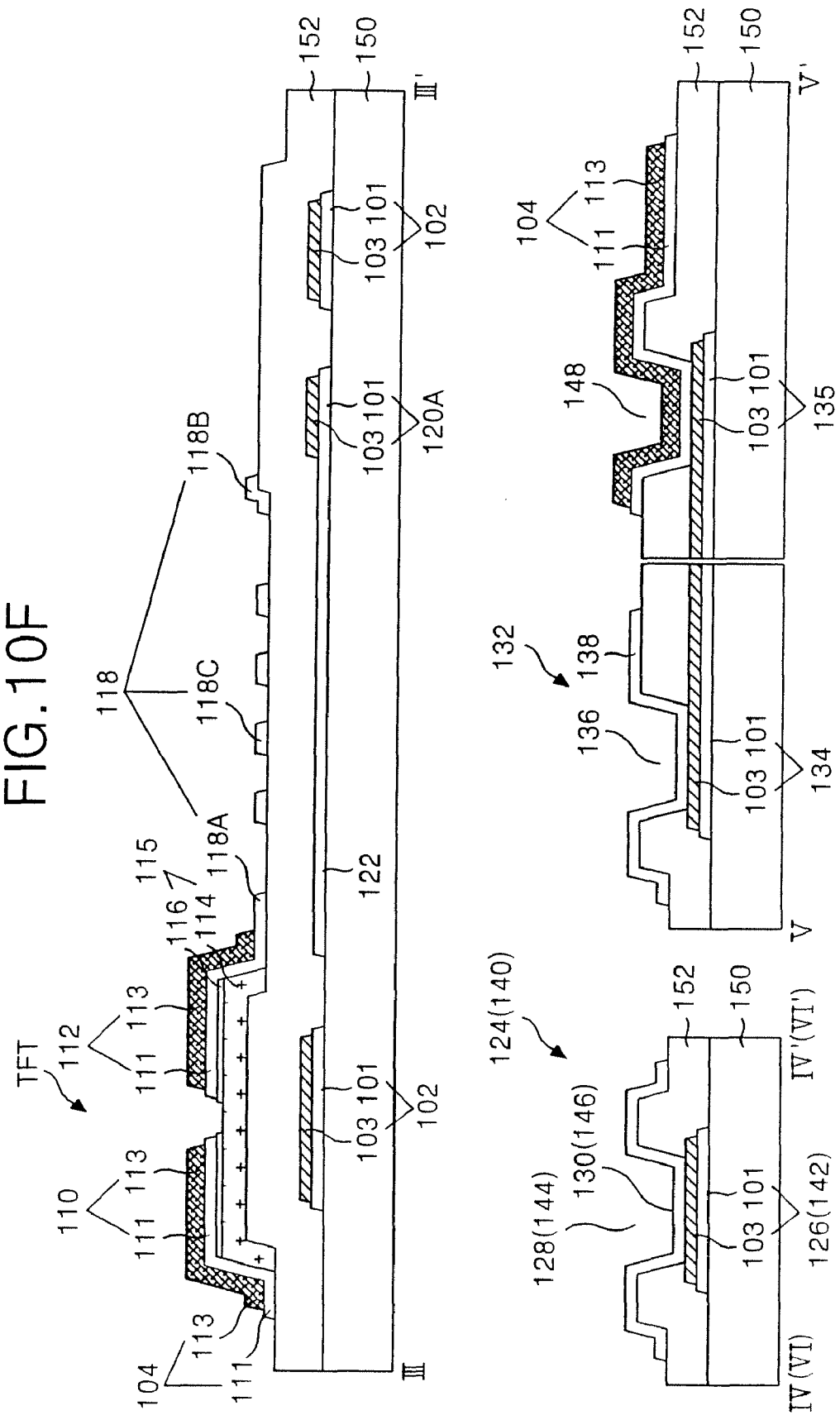

LIQUID CRYSTAL DISPLAY DEVICE WITH A DATA LINK CONNECTING A DATA PAD AND DATA LINE

This application is a divisional application of U.S. patent application Ser. No. 11/312,715 filed on Dec. 21, 2005 now U.S. Pat. No. 7,733,453, which claims the benefit of Korean Patent Application No. P2004-118570 filed in Korea on Dec. 31, 2004, all of which are hereby incorporated by reference for all purposes as if fully set forth herein.

BACKGROUND OF THE INVENTION

1. Field of the Invention

This invention relates to a liquid crystal display device of fringe field switching type, and more particularly to a thin film transistor substrate of fringe field switching type and a fabricating method thereof that are adaptive for simplifying a process.

2. Description of the Related Art

Generally, a liquid crystal display device controls light transmittance of a liquid crystal having a dielectric anisotropy using an electric field to thereby display a picture. To this end, a liquid crystal display device includes a liquid crystal display panel for displaying a picture by a liquid crystal cell matrix, and a driving circuit for driving the liquid crystal display panel.

Referring to FIG. 1, a related art liquid crystal display panel is comprised of a color filter substrate 10 and a thin film transistor substrate 20 that are joined to each other with a liquid crystal 24 therebetween.

The color filter substrate 10 includes a black matrix 4, a color filter 6 and a common electrode 8 that are sequentially provided on an upper glass substrate 2. The black matrix 4 is provided in a matrix type on the upper glass substrate 2. The black matrix 4 divides an area of the upper glass substrate 2 into a plurality of cell areas to be provided with the color filter 6, and prevents a light interference between adjacent cells and an external light reflection. The color filter 6 is provided at the cell area divided by the black matrix 4 in such a manner to be divided into red (R), green (G) and blue (B) ones, thereby transmitting red, green and blue lights. The common electrode 8 is formed of a transparent conductive layer entirely formed onto the color filter 6, and supplies a common voltage Vcom that serves as a reference voltage upon driving of the liquid crystal 24. Further, an over-coat layer (not illustrated) for smoothing the color filter 6 may be provided between the color filter 6 and the common electrode 8.

The thin film transistor substrate 20 includes a thin film transistor 18 and a pixel electrode 22 provided for each cell area defined by an crossing between a gate line 14 and a data line 16 on a lower glass substrate 12. The thin film transistor 18 applies a data signal from the data line 16 to the pixel electrode 22 in response to a gate signal from the gate line 14. The pixel electrode 22 formed of a transparent conductive layer supplies a data signal from the thin film transistor 18 to drive the liquid crystal 24.

The liquid crystal 24 having a dielectric anisotropy is rotated in accordance with an electric field formed by a data signal from the pixel electrode 22 and a common voltage Vcom from the common electrode 8 to control light transmittance, thereby implementing a gray scale level.

Further, a liquid crystal display panel includes a spacer (not illustrated) for uniformly maintaining a cell gap between the color filter substrate 10 and the thin film transistor substrate 20. The spacer employs a ball spacer or a column spacer.

In such the liquid crystal display panel, the color filter substrate 10 and the thin film transistor substrate 20 are formed by a plurality of mask processes. Herein, one mask process includes a lot of processes such as thin film deposition (coating), cleaning, photolithography (hereinafter, photo process), etching, photo-resist stripping and inspection processes, etc. Particularly, since the thin film transistor substrate includes the semiconductor process and requires the plurality of mask processes, it has a complicate fabricating process to act as a major factor in the manufacturing cost rise of the liquid crystal display panel.

Meanwhile, the liquid crystal display panel is largely classified into a vertical electric field applying type and a horizontal electric field applying type depending upon with a direction of the electric field driving the liquid crystal.

The liquid crystal display panel of vertical electric field applying type drives a liquid crystal in a twisted nematic (TN) mode with a vertical electric field formed between a pixel electrode and a common electrode arranged in opposition to each other on the upper and lower substrate. The liquid crystal display panel of vertical electric field applying type has an advantage of a large aperture ratio while having a drawback of a narrow viewing angle about 90°.

The liquid crystal display panel of horizontal electric field applying type drives a liquid crystal in an in plane switching (IPS) mode with a horizontal electric field between the pixel electrode and the common electrode arranged in parallel to each other on the lower substrate. The liquid crystal display panel of horizontal electric field applying type has an advantage of a wide viewing angle about 160°, but has a disadvantage of low aperture ratio and transmittance.

Recently, in order to overcome the disadvantage of the liquid crystal display panel of horizontal electric field applying type, there has been suggested a liquid crystal display panel of fringe field switching (FFS) type operated by a fringe field. The FFS-type liquid crystal display panel includes a common electrode and a pixel electrode having an insulating film therebetween at each pixel area, and is provided such that a distance between the common electrode and pixel electrodes is narrower than a distance between the upper substrate and the lower substrates, to thereby provide a fringe field. Further, the fringe field allows all of liquid crystal molecules filled between the upper and lower substrates to be operated at each pixel area to thereby improve an aperture ratio and a transmittance.

However, since the thin film transistor substrate included in the FFS-type liquid crystal display panel also requires a plurality of mask processes including a semiconductor process, it has a problem of a complicate fabricating process.

SUMMARY OF THE INVENTION

Accordingly, it is an object of the present invention to provide a thin film transistor substrate of fringe field switching type and a fabricating method thereof that are adaptive for simplifying a process.

In order to achieve these and other advantages of the invention, a liquid crystal display device according to one aspect of the present invention includes a gate line on a substrate; a data line crossing the gate line with a gate insulating film to define a pixel area; a thin film transistor including a gate electrode connected to the gate line, a source electrode connected to the data line, a drain electrode opposed to the pixel electrode and a semiconductor layer for defining a channel between the source electrode and the drain electrode; a common line provided in parallel to the gate line on the substrate; a common electrode extended from the common line and formed in the pixel area; and a pixel electrode extended from the drain electrode into the pixel area in a such manner as to overlap the common electrode with the gate insulating film, wherein the gate line and the common line are formed of a first conductive layer group having at least double conductive layers, the common electrode is formed by an extension of the lowermost layer of the common line, and wherein the data line, the source electrode, the drain electrode are formed of a second conductive layer group having at least double conductive layers, and the pixel electrode is formed by an extension of the lowermost layer of the drain electrode.

In the liquid crystal display device, a storage capacitor is provided by an overlapping of the drain electrode with the common electrode.

In the liquid crystal display device, the common electrode has a plate shape, and the pixel electrode has a rib shape.

The liquid crystal display device further includes a gate pad connected to the gate line, a data pad to be connected to the data line and a common pad connected to the common line, wherein each of the gate pad, the data pad and the common pad includes a lower pad electrode formed of the first conductive layer group; a contact hole passing through the gate insulating film to expose the lower pad electrode and an upper pad electrode connected, via the contact hole, to the lower pad electrode and formed of the lowermost layer of the second conductive layer group.

The liquid crystal display device further includes a data link provided such that the first conductive layer group is extended from a lower electrode of the data pad to have a portion thereof overlapped with the data line; and a second contact hole passing through the gate insulating film to connect the data line to the data link.

In the liquid crystal display device, the second contact hole is formed in an area to be sealed by the sealant.

The liquid crystal display device further includes an alignment film on the data line, the source electrode, the drain electrode and the pixel electrode.

In the liquid crystal display device, the second contact hole is formed under the alignment film.

In the liquid crystal display device, the semiconductor pattern is formed at a position to be provided with the thin film transistor.

In the liquid crystal display device, each of the first and second conductive layer includes a lowermost layers thereof having a transparent conductive layer and an upper layer having at least one of a single layer formed of a metal material such as Mo, Ti, Cu, AlNd, Al, Cr, a Mo-alloy, a Cu-alloy or an Al-alloy, a double layer and a triple layer formed of Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo-alloy, Mo-alloy/Al, Al-alloy/Mo-alloy, Mo-alloy/Al-alloy, and Mo/Al-alloy.

In the liquid crystal display device, the first conductive group has step coverage having a stepwise shape.

In the liquid crystal display device, the second conductive group has step coverage having a stepwise shape.

A method of fabricating a liquid crystal display device according to still another aspect of the present invention includes a first mask process forming a first mask pattern group including a gate line have a first conductive layer group having at least double conductive layers, a gate electrode connected to the gate line, a common line parallel to the gate line, a common electrode formed by an extension of the lowermost layer of the common line having a single layer structure on a substrate; a second mask process forming a gate insulating film on the first mask pattern group and a semiconductor pattern on the gate insulating film; and a third mask process forming a third mask pattern group including a data line, a source electrode connected to the data line and a drain electrode opposed to the source electrode having a second conductive layer group structure of at least double conductive layers, and a pixel electrode formed by an extension of overlapping the common electrode with the lowermost layer of the drain electrode having a single layer structure, on the gate insulating film provided with the semiconductor pattern at an area to be sealed by the sealant.

The method further includes forming an alignment film on the third mask pattern group.

In the method, the first mask process includes forming a lower pad electrode to be connected to at least one of the gate line, the data line and the common line from the first conductive layer group, the second mask process includes forming a contact hole passing through the gate insulating film to expose the lower pad electrode, and the third mask process includes forming an upper pad electrode to be connected, via said contact hole, to the lower pad electrode from the lowermost layer of the second conductive layer group.

In the method, the first mask process includes forming a data link provided such that the first conductive layer group is extended from the lower pad electrode to be overlapped with the data line, and the second mask process includes forming a second contact hole for connecting the data link with the data line.

In the method, the first mask process includes forming the first conductive layer group on the substrate; forming a different thickness of the first and second photo-resist patterns by a photolithography using one of a half tone mask and a diffractive exposure mask; forming the first mask pattern group including the common electrode having the second conductive layer group structure by an etching process using the first and second photo-resist patterns; removing the second photo-resist pattern and etching the exposed common electrode to remain the lowermost layers thereof; and removing the first photo-resist pattern.

In the method, the second mask process includes forming a gate insulating film, an amorphous silicon layer and an amorphous silicon layer doped with an impurity on the first mask pattern group; forming a different thickness of the first and second photo-resist patterns by a photolithography using one of a half tone mask and a diffractive exposure mask; and forming the contact holes by an etching process using the first and second photo-resist patterns; removing the second photo-resist pattern and forming the semiconductor pattern by an etching process using the first photo-resist pattern; and removing the first photo-resist pattern.

In the method, the third mask process includes forming the second conductive layer group on the gate insulating film provided with the semiconductor pattern; forming a different thickness of the first and second photo-resist patterns using one of a half tone mask and a diffractive exposure mask; forming a third mask pattern group having the upper pad electrode by patterning the second conductive layer group by an etching process using the first and second photo-resist patterns; removing an amorphous silicon layer doped with an impurity exposed between the source electrode and the drain electrode; and removing the second photo-resist pattern and etching the exposed upper pad electrode to remain only the lowermost layers thereof; and removing the first photo-resist pattern.

In the method, each of the first and second conductive layers includes a lowermost layer having a transparent conductive layer and an upper layer having at least one of a single layer formed of a metal material such as Mo, Ti, Cu, AlNd, Al, Cr, a Mo-alloy, a Cu-alloy or an Al-alloy, a double layer and a triple layer formed of Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al (Nd), Cu-alloy/Mo, Cu-alloy/Al, Cu-alloy/Mo-alloy, Cu-alloy/Al-alloy, Al/Mo-alloy, Mo-alloy/Al, Al-alloy/Mo-alloy, Mo-alloy/Al-alloy, and Mo/Al-alloy.

The method further includes if the lowermost layer of the second conductive layer group is over-etched in comparison to the upper layer thereof when the second conductive group is patterned, then etching each side of the upper layer exposed through the second photo-resist pattern to locate the edge of the upper layer at an inner side than that of the lowermost layer.

In the method, at least two layers of the semiconductor pattern, the source electrode, the drain electrode and the pixel electrode have step coverage taking a stepwise shape.

In the method, the second contact hole is formed in an area to be sealed by the sealant.

In the method, the second contact hole is formed under the alignment film.

In the method, the first conductive group has step coverage having a stepwise shape.

In the method, the second conductive group has step coverage having a stepwise shape.

BRIEF DESCRIPTION OF THE DRAWINGS

These and other advantages of the invention will be apparent from the following detailed description of the embodiments of the present invention with reference to the accompanying drawings.

In the drawings:

FIG. 6a to FIG. 6e are sectional views for specifically explaining the first mask process;

FIG. 7a and FIG. 7b are a plan view and a sectional view for explaining a second mask process in a method of fabricating the thin film transistor substrate of fringe field switching type according to the embodiment of the present invention, respectively;

FIG. 8a to FIG. 8f are sectional views for specifically explaining the second mask process;

FIG. 9a and FIG. 9b are a plan view and a sectional view for explaining a third mask process in a method of fabricating the thin film transistor substrate of fringe field switching type according to the embodiment of the present invention, respectively; and FIG. 10a to FIG. 10f are sectional views for specifically explaining the third mask process.

DETAILED DESCRIPTION OF THE ILLUSTRATED EMBODIMENT

Hereinafter, the illustrated embodiments of the present invention will be described in detail with reference to FIG. 3 to FIG. 10f.

Figure 1:
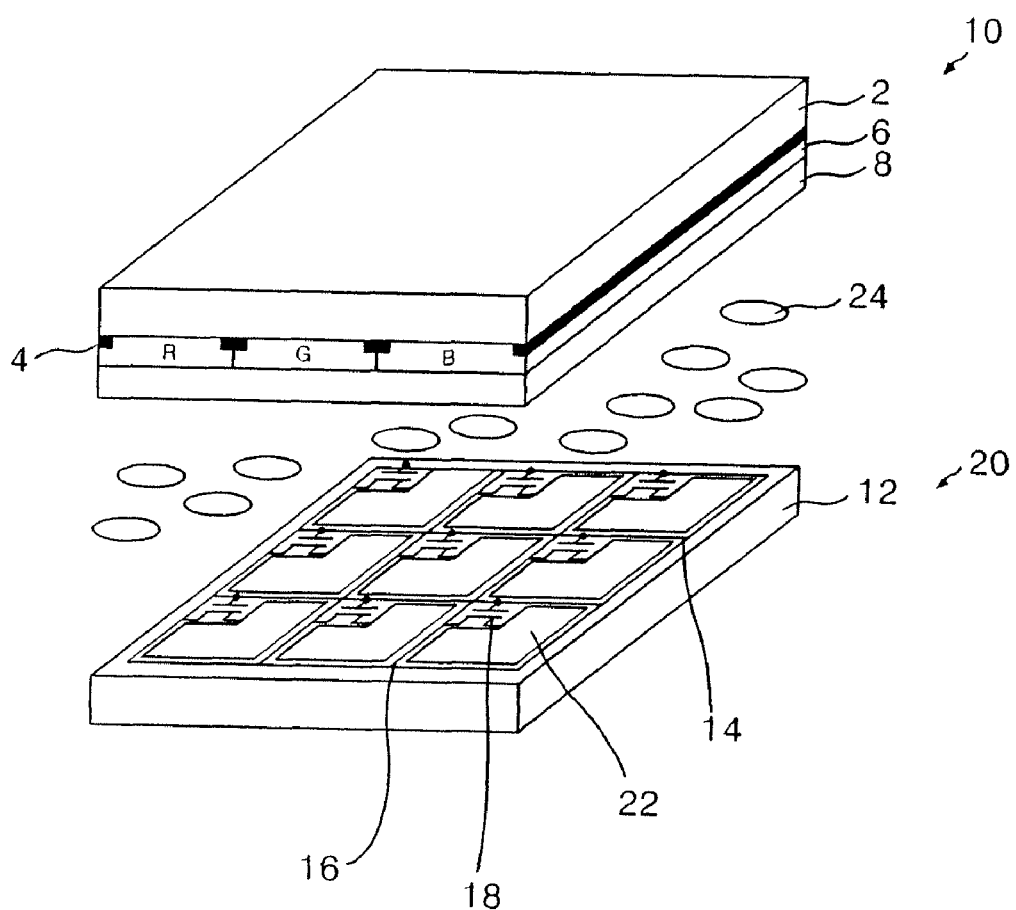
FIG. 1 is a schematic perspective view illustrating a structure of a related art liquid crystal display panel.
Figure 2:
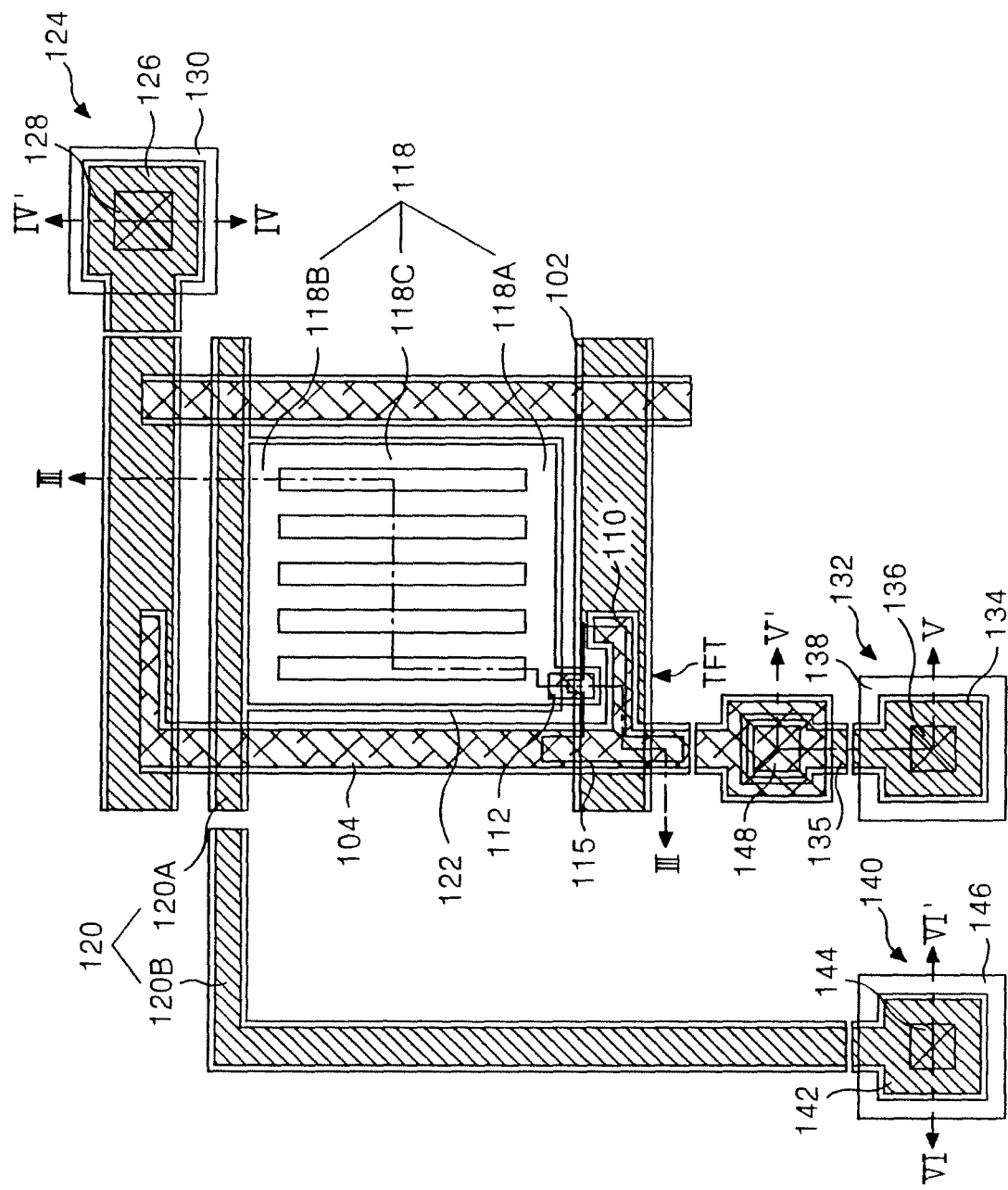
FIG. 2 is a plan view illustrating a structure of a thin film transistor substrate of fringe field switching type according to an embodiment of the present invention.
Figure 3:
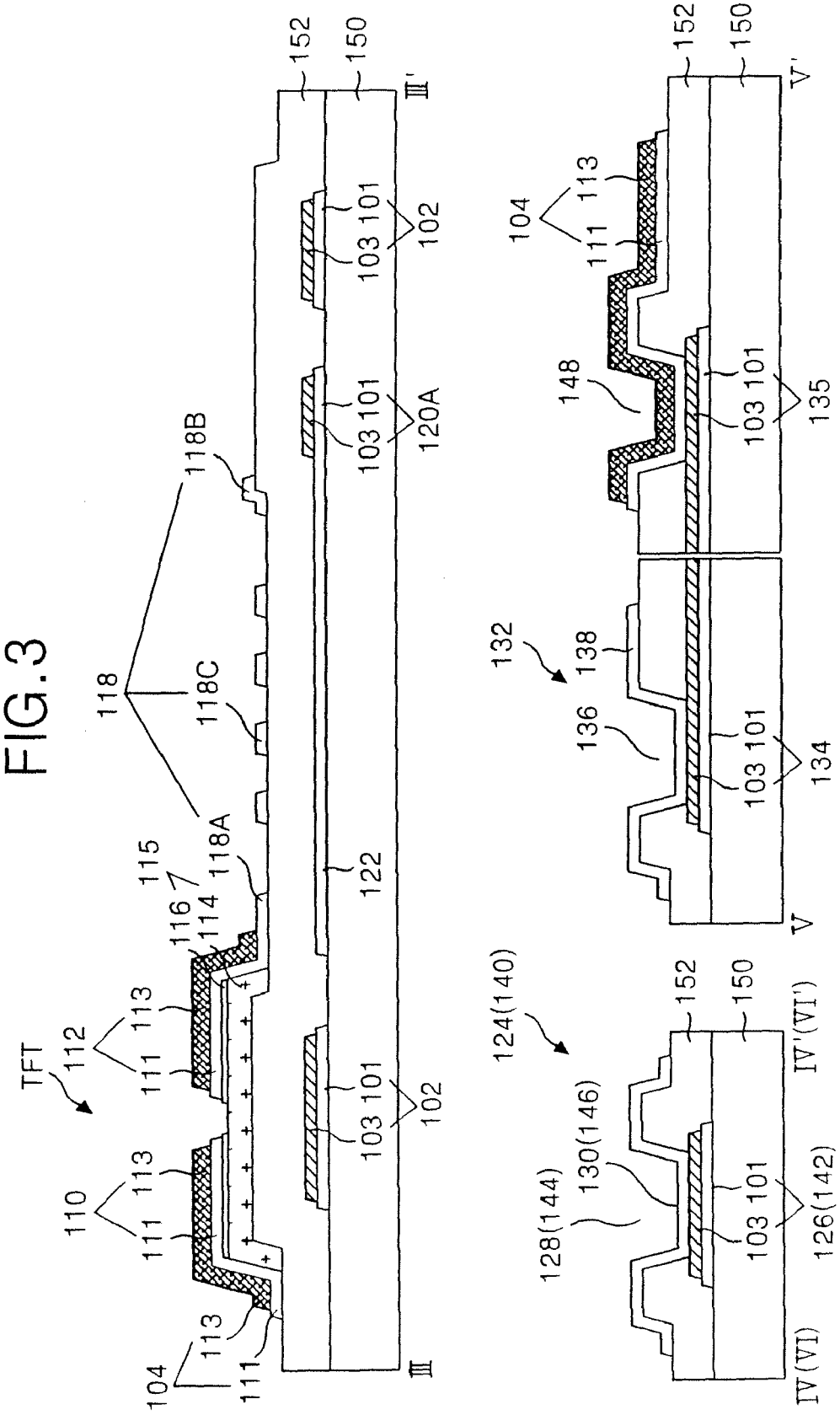
FIG. 3 is a sectional view of the thin film transistor substrate of horizontal electric field applying type taken along the III-III', IV-IV' and VI-VI' lines in FIG. 2.

FIG. 2 is a plan view illustrating a structure of a thin film transistor substrate of fringe field switching (FFS) type according to an embodiment of the present invention, and FIG. 3 is a sectional view of the thin film transistor substrate taken along the III-III', IV-IV', V-V' and VI-VI' lines in FIG. 2.

Referring to FIG. 2 and FIG. 3, the FFS-type thin film transistor substrate includes a gate line 102 and a data line 104 provided on a lower substrate 150 crossing each other with a gate insulating film 152 therebetween, a thin film transistor TFT connected to each crossing, a pixel electrode 118 provided at a pixel area defined by the crossing structure to be connected to the thin film transistor TFT, a common electrode 122 provided, along with the pixel electrode 118, at the pixel area to form a fringe field, and a common line 120 connected to the common electrode 122. Further, the FFS-type thin film transistor substrate includes a gate pad 124 connected to the gate line 102, a data pad 132 connected to the data line 104, and a common pad 140 connected to the common line 120.

The gate line 102 supplies a scanning signal from a gate driver (not illustrated) while the data line 104 supplies a video signal from a data driver (not illustrated). The gate line 102 and the data line 104 cross each other with the gate insulating film 152 therebetween to define the pixel area.

The gate line 102 is formed on the substrate 150 in a multiple-layer structure having at least double gate metal layers. For instance, as illustrated FIG. 3, the gate line 102 has a double-layer structure in which a first conductive layer 101 employing a transparent conductive layer and a second conductive layer 103 formed of an opaque metal are built. The data line 104 is formed on the gate insulating film 152 in a multiple-layer structure having at least double gate metal layers. For instance, as illustrated FIG. 3, the data line 104 has a double-layer structure in which a third conductive layer 111 employing a transparent conductive layer and a fourth conductive layer 113 formed of an opaque metal are built. In this case, the first and third conductive layers 101 and 111 are formed of ITO, TO, IZO or ITZO, etc. while the second and fourth conductive layers 103 and 113 are formed of Cu, Mo, Al, a Cu-alloy, a Mo-alloy and a Al-alloy etc.

The thin film transistor TFT allows a video signal applied to the data line 104 to be charged into the pixel electrode 118 and be kept in response to a scanning signal applied to the gate line 102. The thin film transistor TFT includes a gate electrode included in the gate line 102, a source electrode 110 connected to the data line 104, a drain electrode 112 positioned in opposition to the source electrode 110 to be connected to the pixel electrode 118, an active layer 114 overlapping with the gate line 102 with the gate insulating film 152 therebetween to provide a channel between the source electrode 110 and the drain electrode 112, and an ohmic contact layer 116 formed on the active layer 114 other than the channel portion to make an ohmic contact with the source electrode 110 and the drain electrode 112. Herein, the source electrode 110 and the drain electrode 112, along with the above-mentioned data line 104, have a double-layer structure in which the third conductive layer and fourth conductive layers 111 and 113 are built on the gate insulating film 152 provided with a semiconductor pattern 115.

The common line 120 and the common electrode 122 supply a reference voltage for driving the liquid crystal, that is, a common voltage to each pixel.

The common line 120 includes an internal common line 120A provided in parallel to the gate line 102 at a display area, and an external common line 120B commonly connected to the internal common line 120A at an non-display area. The common line 120 is formed in a layer built structure of the first and second conductive layers 101 and 103 like the gate line 102.

The plate-shaped common electrode 122 is provided within the pixel area to be connected to the internal common line 120A. More specifically, the common electrode 122 is extended from the first conductive layer 101 of the internal common line 120A into each pixel area and formed into a plate shape. In other words, the common electrode 122 is formed of a transparent conductive layer being integral to the first conductive layer 101 of the common line 120.

The rib-shaped pixel electrode 118 is extended from the drain electrode 112 of the TFT and overlaps with the common electrode 122, with the gate insulating film 152 therebetween at each pixel area to form a fringe field. More specifically, the pixel electrode 118 is formed of the third conductive layer 111 extended from the drain electrode 112, that is, a transparent conductive layer. Further, the pixel electrode 118 includes a first horizontal rib 118A provided in parallel to the gate line 102, a second horizontal rib 118B provided in parallel to the common line 120A, and a plurality of vertical ribs 118C connected between the first and second horizontal ribs 118A and 118B. The pixel electrode 118 is connected to the drain electrode 112. If a video signal is applied via the thin film transistor TFT to the rib-shaped pixel electrode 118, then the rib-shaped pixel electrode 118 forms a fringe field along with the plate-shaped common electrode 122 supplied with the common voltage. Thus, liquid crystal molecules arranged in the horizontal direction between the thin film transistor array substrate and the color filter array substrate by such a fringe field are rotated due to a dielectric anisotropy. Transmittance of a light transmitting the pixel area is differentiated depending upon a rotation extent of the liquid crystal molecules, thereby implementing a gray level scale.

Further, the overlapping portion between the common electrode 122 and the pixel electrode 118 is provided with a storage capacitor for stably keeping a video signal applied to the pixel electrode 118.

The gate line 102 is connected, via the gate pad 124, to the gate driver (not illustrated). The gate pad 124 consists of a lower gate pad electrode 126 extended from the gate line 102, and an upper gate pad electrode 130 connected, via a first contact hole 128 passing through the gate insulating film 152, to the lower gate pad electrode 126.

The data line 104 is connected, via the data pad 132, to a data driver (not illustrated). The data pad 132 consists of a lower data pad electrode 134 connected to a data link 135, and an upper data pad electrode 138 connected, via a second contact hole 136 passing through the gate insulating film 152, to the lower data pad electrode 134.

The common line 120 receives a reference voltage from a common voltage source (not illustrated) via the common pad 140. The common pad 140 includes a lower common pad electrode 142 extended from the external common line 120B, and an upper common pad electrode 146 provided within a third contact hole 144 passing through the gate insulating film 152 to be connected to the lower common pad electrode 142.

In such a thin film transistor substrate according to the embodiment of the present invention, the data pad 132 has the same structure as the gate pad 124 and the common pad 140. More specifically, the lower gate pad electrode 126, the lower common pad electrode 142, the lower data pad electrode 134 and the data link 135 are formed on the substrate 150 in a double-layer structure in which the first conductive layer and second conductive layers 101 and 103 are built like the gate line 102. Also, the upper gate pad electrode 130, the upper common pad electrode 146, the upper data pad electrode 138 and the data line 104 are formed on the gate insulating film 152, and are formed of the third conductive layer 111 in which the fourth conductive layer 113 is removed, that is, a transparent conductive layer.

Accordingly, the data link 135 formed on the substrate 150 is connected, via a fourth contact hole 148 passing through the gate insulating film, to the data line 104. In this case, the data line 104 is exposed due to an absence of the protective film. In order to prevent the data line 104 from being exposed to the exterior thereof and oxidized, as illustrated FIG. 4, the fourth contact hole 148 is positioned within an area sealed by a sealant 200. Thus, the data line 104 positioned at the sealed area is protected by a lower alignment film 214 to be formed thereon.

Figure 4:
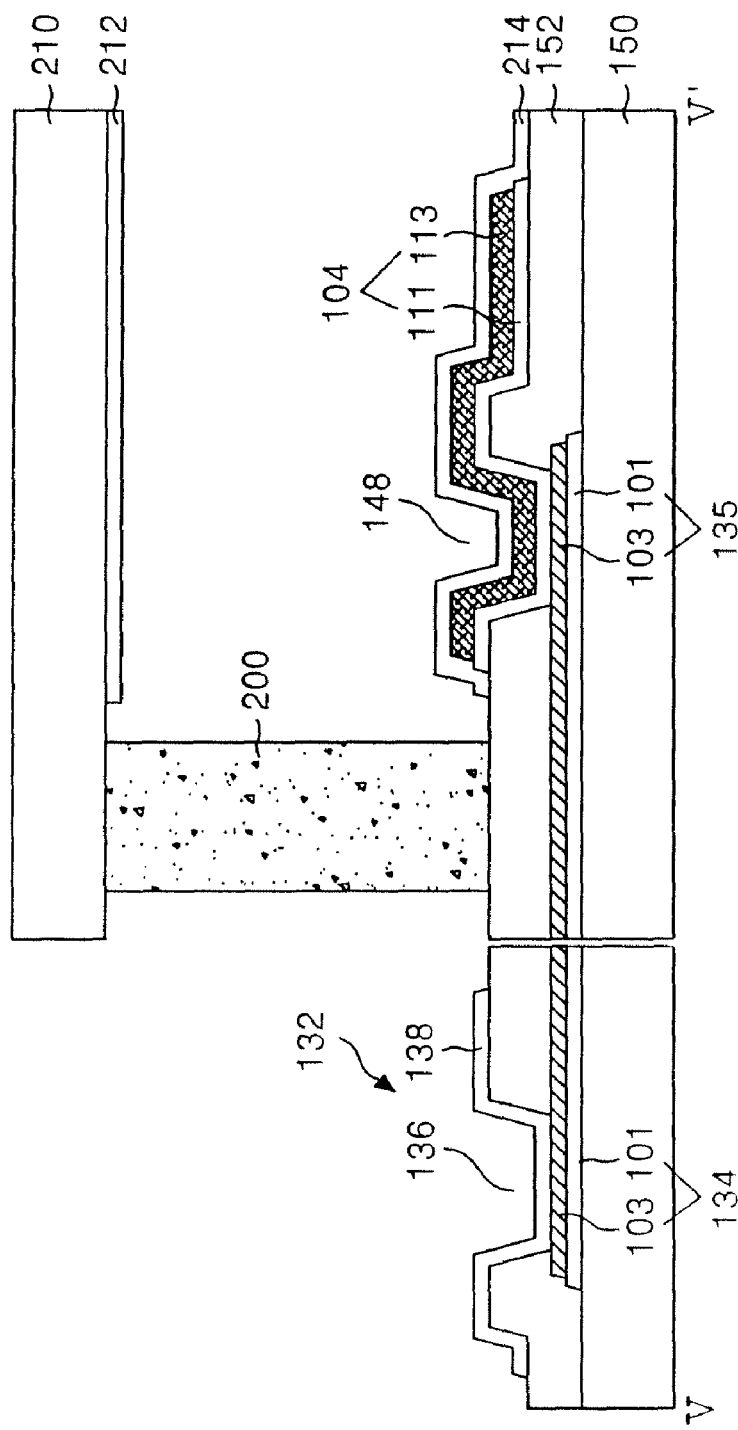
FIG. 4 is a sectional view illustrating a data pad area of a liquid crystal display panel employing the thin film transistor substrate of horizontal electric field applying type illustrated in FIG. 3.

Referring to FIG. 4, the thin film transistor substrate formed with a lower alignment film 214 and the color filter substrate 210 formed with an upper alignment film 212 are joined to each other by the sealant 200, and a cell gap between two substrates sealed by the sealant 200 is formed with a liquid crystal. The upper and lower alignment films 212 and 214 are formed with an organic insulating material at each picture display area of the two substrates. The sealant 200 is formed with being spaced in such a manner to be not in contact with the upper and lower alignment films 212 and 214 for the purpose of reinforcing an adhesive force. Thus, the data line 104, the source electrode 110, the drain electrode 112, the pixel electrode 118 provided at the thin film transistor substrate are positioned at an area sealed by the sealant 200, so that it may be sufficiently protected by the lower alignment film 214 formed thereon as well as by the liquid crystal formed in the sealed area.

The FFS-type thin film transistor substrate according to the first embodiment of the present invention having the above-mentioned structure is formed by the following three-round mask process.

Figure 5A:
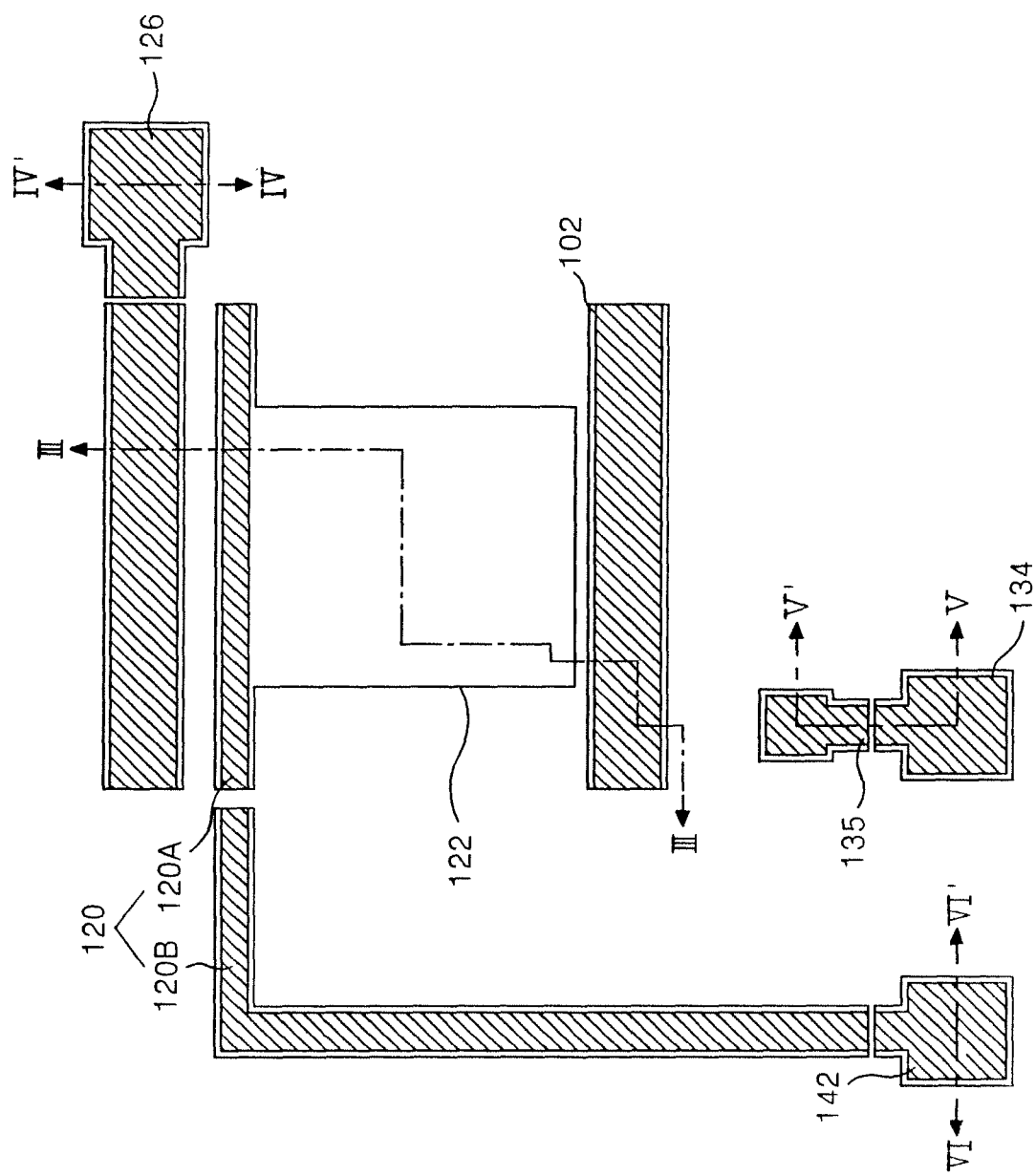
FIG. 5a and FIG. 5b are a plan view and a sectional view for explaining a first mask process in a method of fabricating the thin film transistor substrate of fringe field switching type according to the embodiment of the present invention, respectively.
Figure 5B:
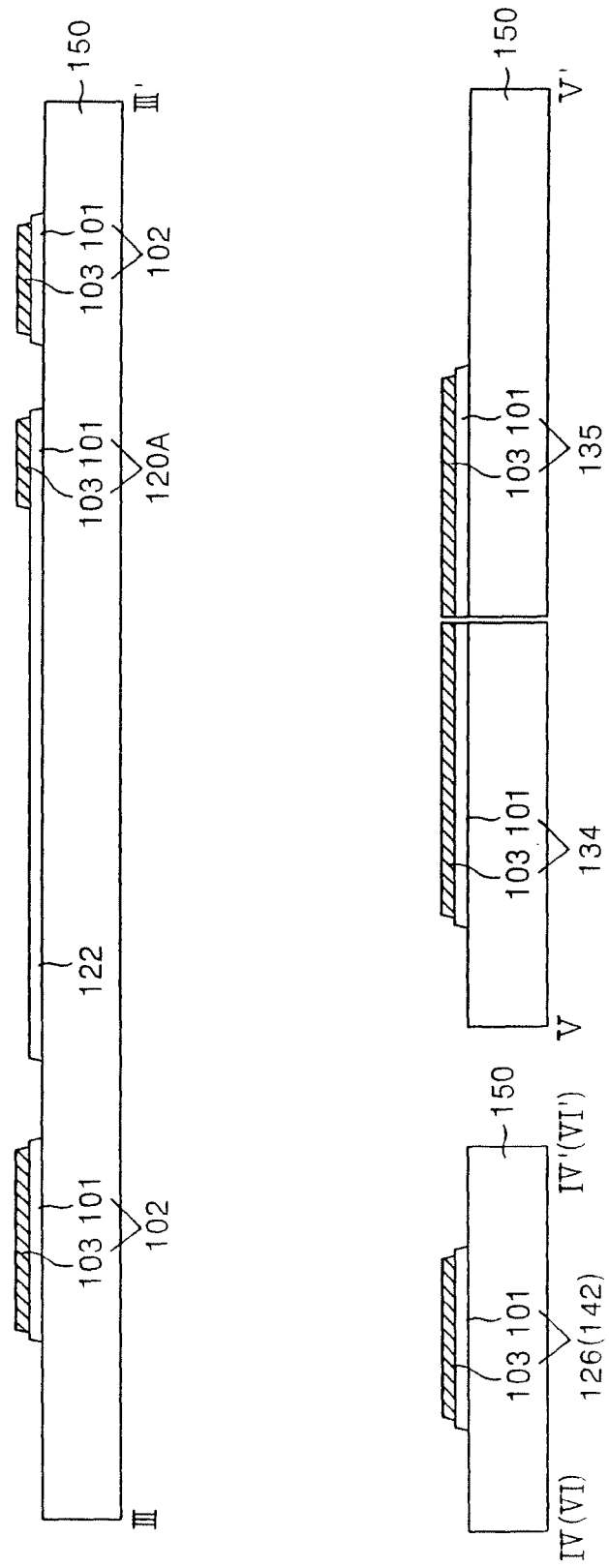

FIG. 5a and FIG. 5b are a plan view and a sectional view for explaining a first mask process, respectively, in a method of fabricating the thin film transistor substrate of fringe field switching type according to the embodiment of the present invention, and FIG. 6a to FIG. 6e are sectional views for specifically explaining the first mask process.

A first mask pattern group including the gate line 102, the lower gate pad electrode 126, the common line 120, the plate-shaped common electrode 122, the lower common pad electrode 142, the data link 135 and the lower data pad electrode 134 is formed on the lower substrate 150 by the first mask process. Herein, the first mask pattern group other than the common electrode 122 has a multiple-layer structure having at least two conductive layers. But, for explanation convenience sake, there will be described only a double-layer structure having the first and second conductive layers 101 and 103 built. The plate-shaped common electrode 122 has a single-layer structure of the first conductive layer 101 that is a transparent conductive layer. The first mask pattern group having such multiple-layer structure and single-layer structure is formed by a single of mask process using a partial transmitting mask such as a diffractive exposure mask or a half tone mask, etc. Hereinafter, a case where the half tone mask is used as a first mask will be described.

Referring to FIG. 6a, the first and second conductive layers 101 and 103 are disposed on the lower substrate 150 by a deposition technique such as the sputtering, etc. The first conductive layer 101 is formed of a transparent conductive material such as ITO, TO, IZO or ITZO, etc. On the other hand, the second conductive layer 103 employs a single layer formed of a metal material such as Mo, Ti, Cu, AlNd, Al, Cr, a Mo-alloy, a Cu-alloy or an Al-alloy, etc., or takes a layer built structure of at least double layers such as Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Mo-alloy, Cu-alloy/Al-alloy, Al/Mo-alloy, Mo-alloy/Al, Al-alloy/Mo-alloy, Mo-alloy/Al-alloy, Mo/Al-alloy, etc.

Referring to FIG. 6b, a second photo-resist pattern 162 having step coverage is formed by the photolithography using a half tone mask. The half tone mask is comprised of a shielding part for shielding an ultraviolet ray, a half-tone transmitting part for partially transmitting the ultraviolet ray using a phase-shifting material, and a full transmitting part for fully transmitting the ultraviolet ray. The second photo-resist pattern 162 including a different thickness of first photo-resist patterns 162A and 162B and an aperture part is formed by the photolithography using a half tone mask. In this case, the relatively thick first photo-resist pattern 162A is provided at a shielding area P1 of the first photo-resist overlapping with the shielding part of the half tone mask; the first photo-resist pattern 162B thinner than the first photo-resist pattern 162A is provided at a half tone exposure area P2 overlapping with the half-tone transmitting part; and the aperture part is provided at an full exposure area P3 overlapping with the full transmitting part.

Further, the exposed portions of the first and second conductive layers 101 and 103 are etched by an etching process using the first photo-resist pattern 162 as a mask, thereby providing the first mask pattern group including a double-layer structure of the gate line 102, the lower gate pad electrode 126, the common line 120, the common electrode 122 and the lower common pad electrode 142, the data link 135 and the lower data pad electrode 136.

Figure 6D:
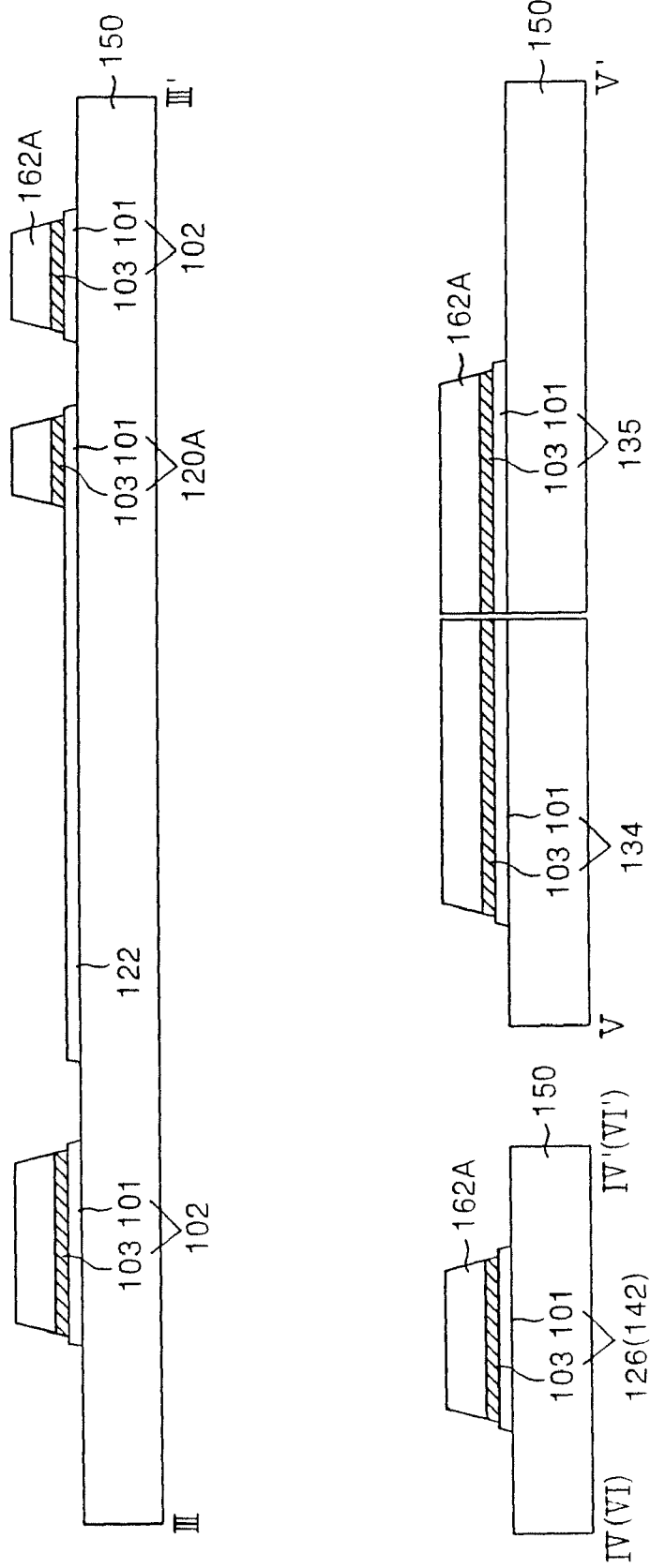

Referring to FIG. 6d, a thickness of the first photo-resist pattern 162A is thinned while the first photo-resist pattern 162B is removed by the ashing process using an oxygen ($O_2$) plasma. Further, the second conductive layer 103 on the common electrode 122 is removed by the etching process using the ashed first photo-resist pattern 162A as a mask. In this case, each side of the patterned second conductive layer 103 is again etched along the ashed first photo-resist pattern 162A, thereby allowing the first and second conductive layers 101 and 103 of the first mask pattern group to has a constant step coverage in a stepwise shape. Accordingly, when the side surfaces of the first and second conductive layers 101 and 103 have a high steep inclination, it becomes possible to prevent poor step coverage of the gate insulating film 152 that may be generated thereon.

Referring to FIG. 6e, the first photo-resist pattern 162A left on the first mask pattern group in FIG. 6d is removed by the stripping process.

Figure 7A:
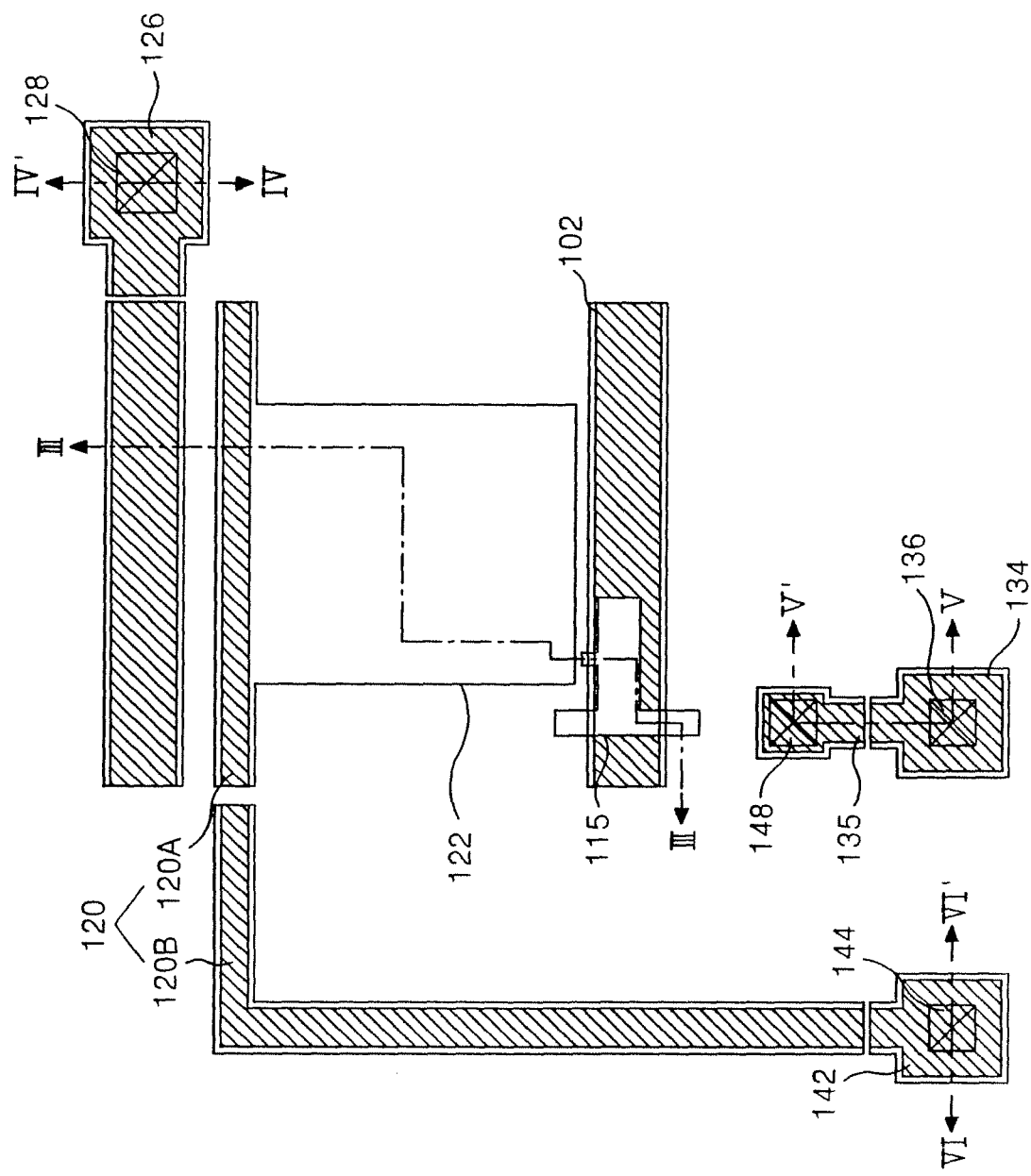

FIG. 7a and FIG. 7b are a plan view and a sectional view for explaining a second mask process in a method of fabricating the FFS-type thin film transistor substrate according to the embodiment of the present invention, respectively, and FIG. 8a to FIG. 8f are section views for specifically explaining the second mask process.

The gate insulating film 152 including the first to fourth contact holes 128, 136, 144 and 148 and the semiconductor pattern 115 are formed on the lower substrate 150 provided with the first mask pattern group by the second mask process. The semiconductor pattern 115, and the contact holes 128, 136, 144 and 148 of the gate insulating film 152 are defined by a single of mask process employing a diffractive exposure mask or a half tone mask. Hereinafter, a case where the half tone mask is used as a second mask will be described.

Figure 8A:
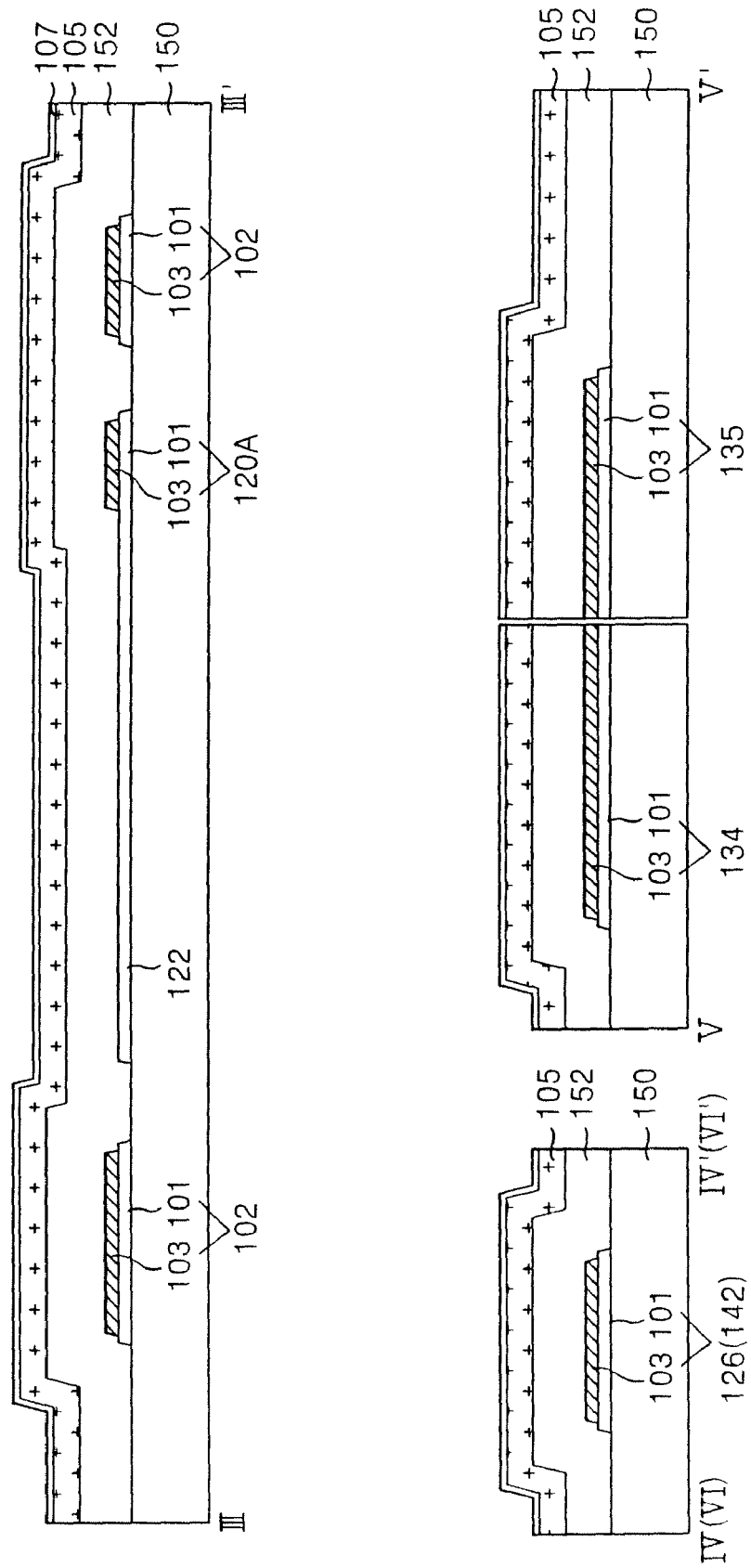

Referring to FIG. 8a, the gate insulating film 152, an amorphous silicon layer 105 and an amorphous silicon layer 107 doped with an $n^+$ or $p^+$ impurity are sequentially disposed on the lower substrate 150 provided with the first mask pattern group by a deposition technique such as the PECVD, etc. Herein, the gate insulating film 152 is formed of an inorganic insulating material such as silicon oxide ($SiO_x$) or silicon nitride ($SiN_x$).

Referring to FIG. 8b, a second photo-resist pattern 168 having step coverage is formed by the photolithography using a half tone mask. The half tone mask is comprised of a shielding part for shielding an ultraviolet ray, a half-tone transmitting part for partially transmitting the ultraviolet ray using a phase-shifting material, and a full transmitting part for fully transmitting the ultraviolet ray. The second photo-resist pattern 168 including a different thickness of second photo-resist patterns 168A and 168B and an aperture part is formed by the photolithography using a half tone mask. In this case, the relatively thick second photo-resist pattern 168A is provided at a shielding area P1 of the second photo-resist overlapping with the shielding part of the half tone mask; the second photo-resist pattern 168B thinner than the second photo-resist pattern 168A is provided at a half tone exposure area P2 overlapping with the half-tone transmitting part; and the aperture part is provided at an full exposure area P3 overlapping with the full transmitting part.

Referring to FIG. 8c, the first to fourth contact holes 128, 136, 144 and 148 passing through the gate insulating film 152 from the amorphous silicon layer 107 doped with an $n^+$ or $p^+$ impurity 107 are formed by the etching process using the second photo-resist pattern 168 as a mask. The first contact hole 128 exposes the lower gate pad electrode 126, the second contact hole 136 exposes the lower data pad electrode 134, the third contact hole 144 exposes the lower common pad electrode 142 and the fourth contact hole 148 exposes the data link 135.

Figure 8D:
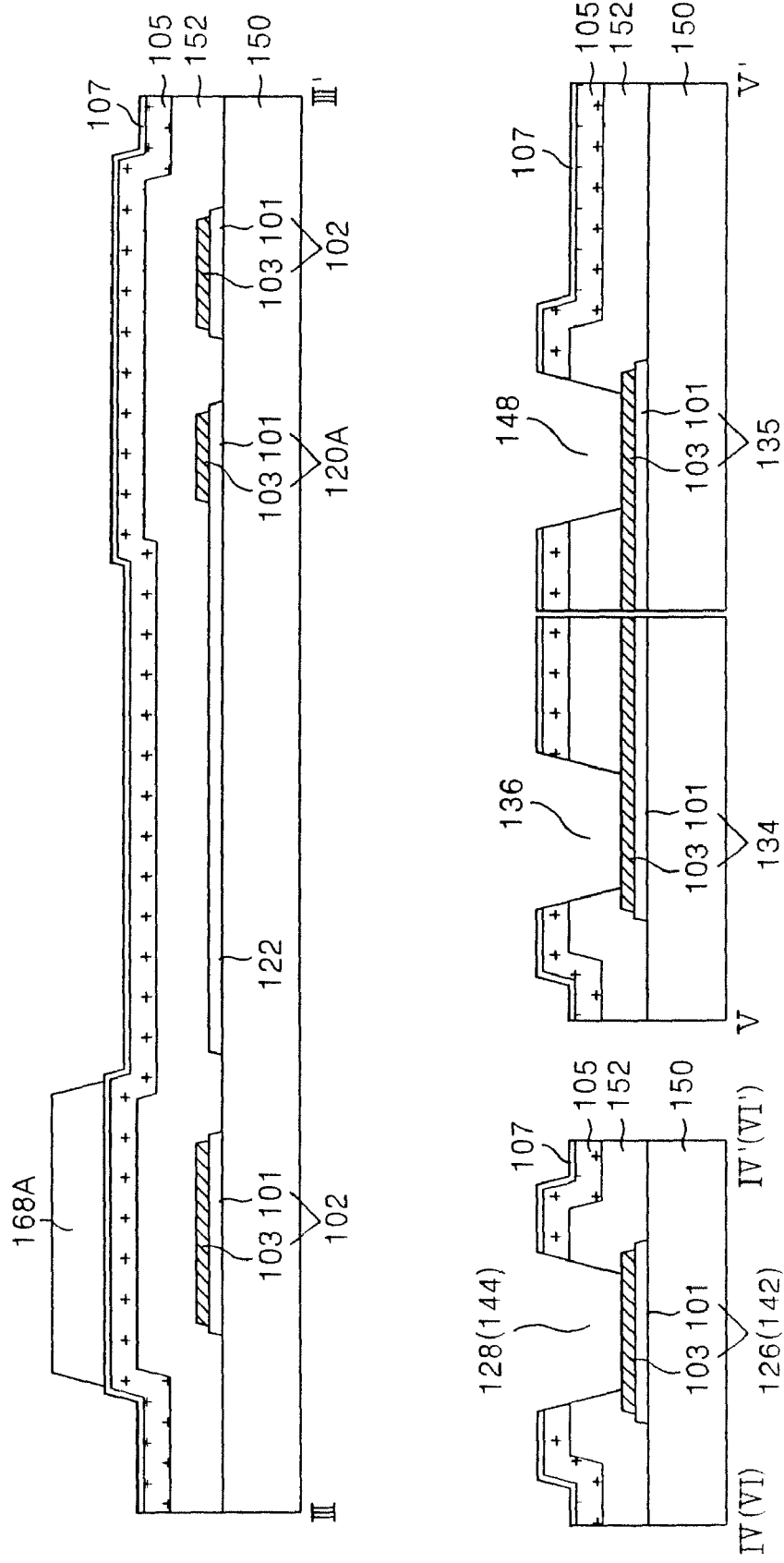

Referring to FIG. 8d, a thickness of the second photo-resist pattern 168A is thinned while the second photo-resist pattern 168B is removed by the ashing process using oxygen ($O_2$) plasma.

Referring to FIG. 8e, the amorphous silicon doped with an $n^+$ or $p^+$ impurity 107 and the amorphous silicon layer 105 are patterned by the etching process using the ashed second photo-resist pattern 168A as a mask to thereby provide the semiconductor pattern 115 including the active layer 114 and the ohmic contact layer 116.

Referring to FIG. 8f, the second photo-resist pattern 168A left on the semiconductor pattern 115 in FIG. 8e is removed by the stripping process.

Figure 9A:
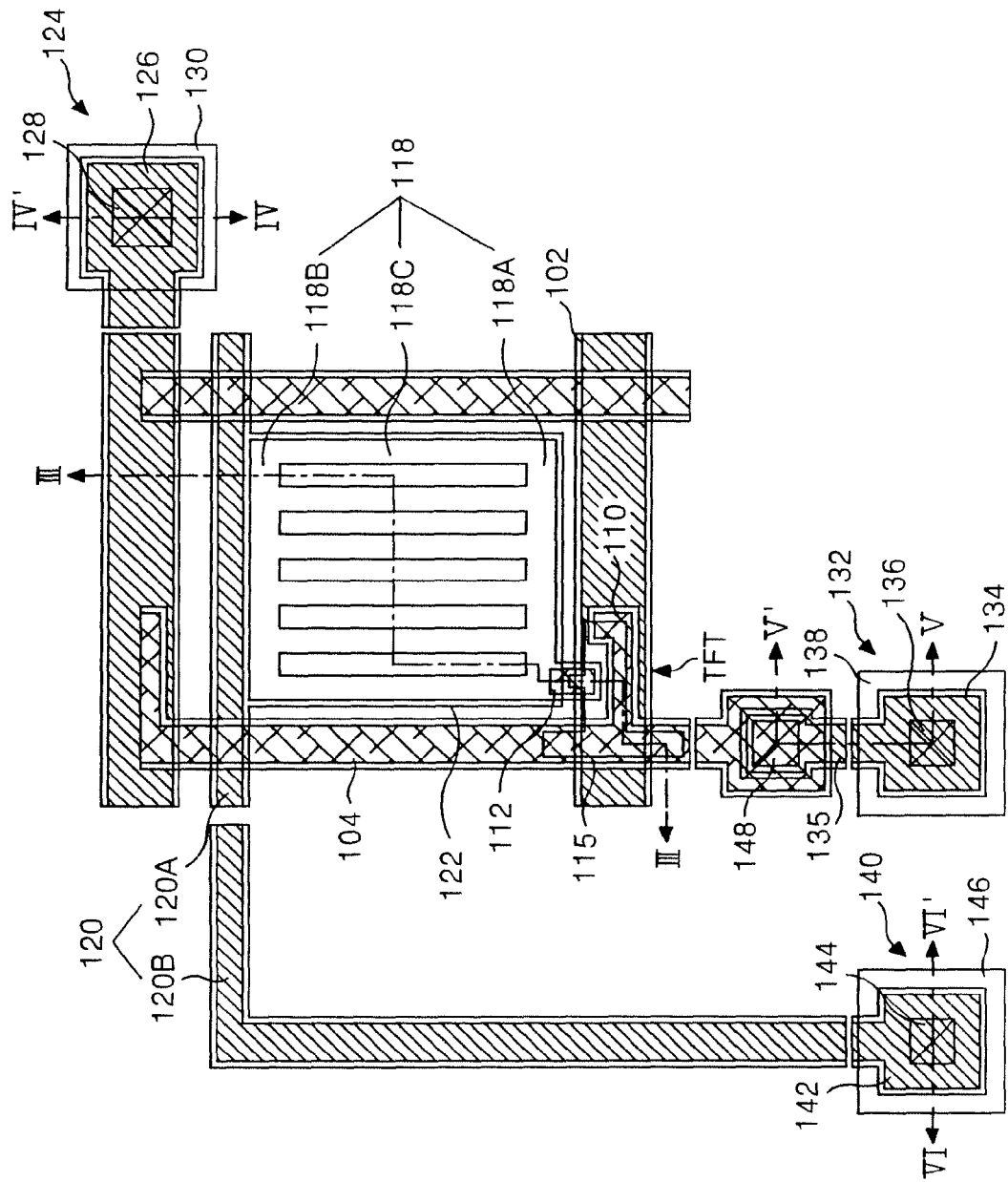

FIG. 9a and FIG. 9b are a plan view and a sectional view for explaining a third mask process in a method of fabricating the thin film transistor substrate of horizontal electric field applying type according to the embodiment of the present invention, respectively, and FIG. 10a to FIG. 10e are sectional views for specifically explaining the third mask process.

A third mask pattern group including the data line 104, the source electrode 110, the drain electrode 112, the rib-shaped pixel electrode 118, the upper gate pad electrode 130, the upper data pad electrode 138 and the upper common pad electrode 146 is formed on the gate insulating film 152 provided with the semiconductor pattern 115 by the third mask process. Herein, the third mask pattern group A including the data line 104, the source electrode 110 and the drain electrode 112 has a multiple-layer structure in which at least two conductive layers are built. But, for explanation convenience sake, there will be described only a double-layer structure having the third and fourth conductive layers 111 and 113 built. The third mask pattern group B including the pixel electrode 118, the upper gate pad electrode 130, the upper data pad electrode 138 and the upper common pad electrode 146 has a single-layer structure formed of the third conductive layer 111 of the third mask pattern group A. The third mask pattern group including the third mask pattern group A having such a double-layer structure and the third mask pattern group B having such a single-layer structure is formed by the third mask process using a diffractive exposure mask or a half tone mask. Hereinafter, a case where the half tone mask is used as a third mask will be described.

Figure 10A:
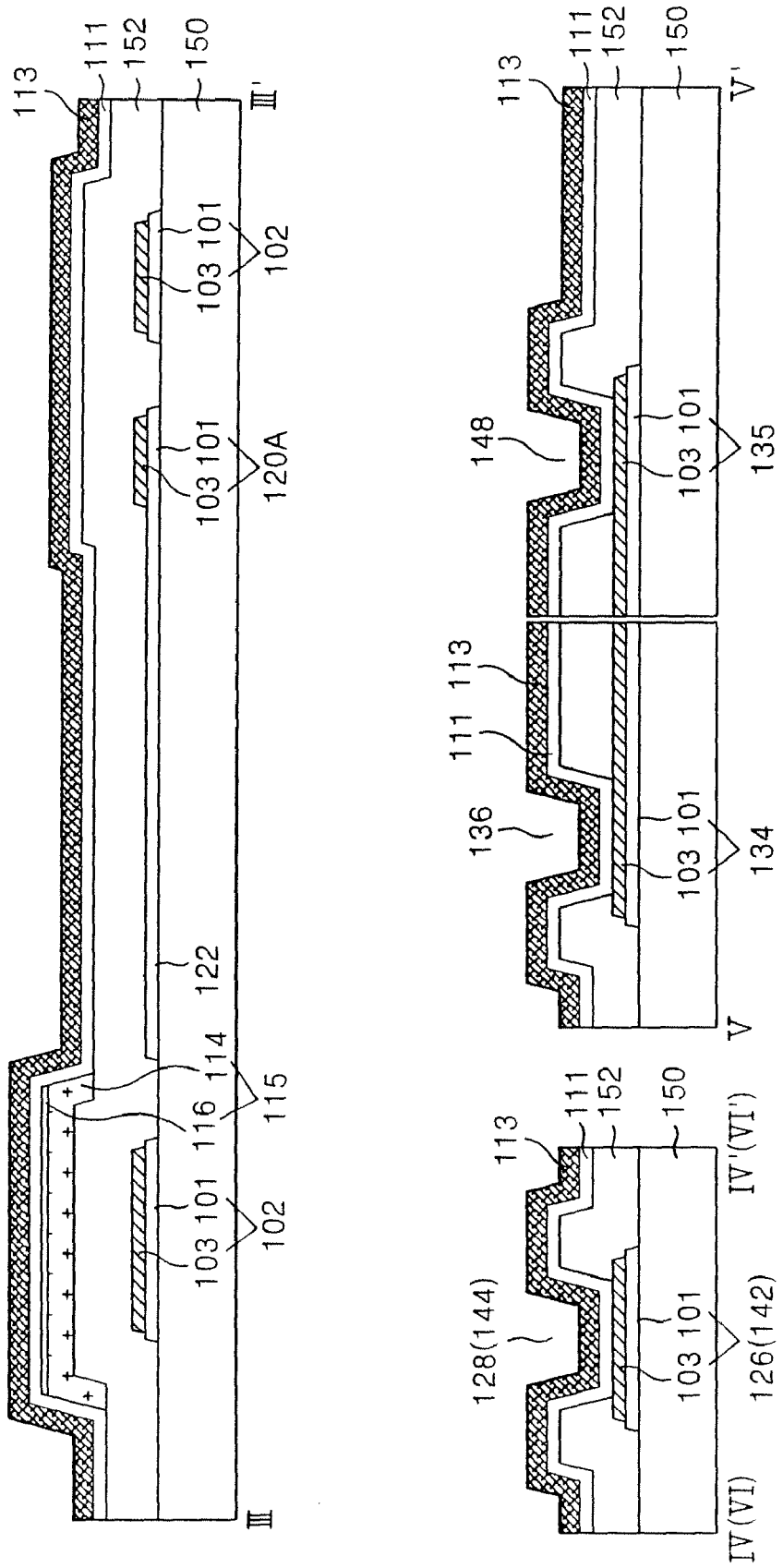

Referring to FIG. 10a, the third and fourth conductive layers 111 and 113 are sequentially formed on the gate insulating film 152 provided with the semiconductor pattern 115 by a deposition technique such as the sputtering, etc. The third conductive layer 111 is formed of a transparent conductive material such as ITO, TO, IZO or ITZO, etc. The fourth conductive layer 113 employs a single layer formed of a metal material such as Mo, Ti, Cu, AlNd, Al, Cr, a Mo-alloy, a Cu-alloy or an Al-alloy, etc., or takes a layer built structure of at least double layers such as Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo-alloy, Mo-alloy/Al, Al-alloy/Mo-alloy, Mo-alloy/Al-alloy, Mo/Al-alloy, etc.

Referring to FIG. 10b, a third photo-resist pattern 182 having step coverage is formed by the photolithography using a half tone mask. The half tone mask is comprised of a shielding part for shielding an ultraviolet ray, a half-tone transmitting part for partially transmitting the ultraviolet ray using a phase-shifting material, and a full transmitting part for fully transmitting the ultraviolet ray. The third photo-resist pattern 182 including a different thickness of third photo-resist patterns 182A and 182B and an aperture part is formed by the photolithography using a half tone mask. In this case, the relatively thick third photo-resist pattern 182A is provided at a shielding area P1 of the third photo-resist overlapping with the shielding part of the half tone mask; the third photo-resist pattern 182B thinner than the third photo-resist pattern 182A is provided at a half tone exposure area P2 overlapping with the half-tone transmitting part; and the aperture part is provided at an full exposure area P3 overlapping with the full transmitting part.

Referring to FIG. 10c, the third and fourth conductive layers 111 and 113 are patterned by the wet-etching process using the third photo-resist pattern 182 as a mask to thereby provide a double-layer structure of the data line 104, the source electrode 110, the drain electrode 112, the pixel electrode 118, the upper gate pad electrode 130, the upper data pad electrode 138 and the upper common pad electrode 146. The data line 104 is overlapped with the data link 135 and is connected, via the fourth contact hole 148, to the data link 135. In this case, since the fourth conductive layer 113 is etched and then the third conductive layer 111 is etched by a different etchant, the third conductive layer 111 positioned at a lower portion than the upper fourth conductive layer 113 is over-etched to cause an under-cut area.

Referring to FIG. 10d, the ohmic contact layer 116 between the source electrode 110 and the drain electrode 112 is removed by the etching process using the source electrode 110 and the drain electrode 112 having the third photo-resist pattern 182A as a mask, for example, the dry-etching process, to thereby expose the active layer 114. Such a dry etching allows the edge of the separated ohmic contact layer 116 to have more protruded shape than that of the third conductive layer 111.

Referring to FIG. 10e, a thickness of the third photo-resist pattern 182A is thinned while the third photo-resist pattern 182B is removed by the ashing process. Such a removal of the third photo-resist pattern 182B exposes the fourth conductive layer 113 of the pixel electrode 118, the upper gate pad electrode 130, the upper data pad electrode 138 and the upper common pad electrode 146. Further, the edge of the ashed third photo-resist pattern 182A is positioned at the inner side of the edge of the patterned fourth conductive layer 113.

Referring to FIG. 10f, the fourth conductive layers 113 of the pixel electrode 118, the upper gate pad electrode 130, the upper data pad electrode 138 and the upper common pad electrode 146 are etched by the etching process using the ashed third photo-resist pattern 182A as a mask to thereby provide the pixel electrode 118, the upper gate pad electrode 130, the upper data pad electrode 138 and the upper common pad electrode 146 that have a single-layer structure of the third conductive layer 111. In this case, each side of the fourth conductive layer 113 exposed through the edge of the third photo-resist pattern 182A is again etched. Thus, the third and fourth conductive layers 111 and 113 of the data line 104, the source electrode 110 and the drain electrode 112 have a constant step coverage taking a stepwise shape. Particularly, the third and fourth conductive layers 111 and 113 of the source electrode 110 and drain electrode 112 exposing the channel of the thin film transistor TFT, that is, the active layer 114 and the ohmic contact layer 116 under them have a step coverage taking a stepwise shape. Accordingly, a channel width W and length L of the thin film transistor TFT are determined by the third conductive layer 111 of the source electrode 110 and the drain electrode 112. Further, the third photo-resist pattern 182A is removed by the stripping process.

As a result, the thin film transistor substrate of fringe field switching (FFS) type according to the embodiment of the present invention has an exposed structure of the data line 104, the source electrode 110 and the pixel electrode 118 due to an absence of the protective film. However, all of them are positioned at an area sealed by the sealant, so that they can be sufficiently protected by the lower alignment film formed thereon as well as by the liquid crystal formed in the sealed area.

As described above, in the thin film transistor substrate of fringe field switching (FFS) type and a fabricating method thereof according to the present invention, a single-layer structure of common electrode is formed, along with a multiple-layer structure of other first mask pattern group, with the aid of the first half tone (or a diffractive exposure) mask.

Furthermore, in the thin film transistor substrate of fringe field switching (FFS) type and the fabricating method thereof according to the present invention, the semiconductor pattern and the contact hole are formed with the aid of the second half tone (or a diffractive exposure) mask.

Moreover, in the thin film transistor substrate of fringe field switching (FFS) type and the fabricating method thereof according to the present invention, a single-layer structure of pixel electrode and upper pad electrodes are formed, along with a multiple-layer structure of other third mask pattern group, with the aid of the third half tone (or a diffractive exposure) mask without the protective film.

Accordingly, the entire process can be simplified by the three-round mask process, so that it becomes possible to reduce the material cost and the equipment investment cost, as well as to improve the productivity.

Furthermore, according to the present invention, the data line, the source electrode, the drain electrode and the pixel electrode exposed due to an absence of the protective film in the tin film transistor substrate to be sufficiently protected by the lower alignment film formed thereon or by the liquid crystal formed in the area sealed by the sealant. Also, it permits all the pads of the thin film transistor substrate to have the same structure, and permits the data link connected to the data pad to be connected, via the contact hole, to the data line within an area sealed by the sealant. Thus, it becomes possible to prevent an illumination problem, etc. caused by an absence of the protective film.

Although the present invention has been explained by the embodiments illustrated in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising:
    a gate line provided on a substrate;
    a data line crossing the gate line with a gate insulating film to define a pixel area;
    a thin film transistor including a gate electrode connected to the gate line, a source electrode connected to the data line, a drain electrode opposed to the source electrode and a semiconductor layer for defining a channel between the source electrode and the drain electrode;
    a common line provided in parallel to the gate line on the substrate;
    a common electrode extended from the common line into the pixel area;
    a pixel electrode extended from the drain electrode into the pixel area in such a manner as to overlap the common electrode with the gate insulating film;
    an alignment film coated on the substrate including the data line;
    a color filter substrate joined to the substrate by a sealant,
    wherein the gate line and the common line are formed of a first conductive layer group having at least double conductive layers formed on the substrate, and the common electrode is formed by an extension of the lowermost layer of the common line; and
    wherein the data line, the source electrode and the drain electrode are formed of a second conductive layer group having at least double conductive layers, and the pixel electrode is formed by an extension of the lowermost layer of the drain electrode;
    a gate pad connected to the gate line;
    a data pad connected to the data line via a data link, the data link formed of the first conductive layer group extended from a lower electrode of the data pad to have a portion thereof overlapped with and directly in contact with the data line;
    a common pad connected to the common line,
    wherein each of the gate pad, the data pad and the common pad includes: a lower pad electrode formed of the first conductive layer group; a first contact hole passing through the gate insulating film to expose the lower pad electrode; and an upper pad electrode connected to the lower pad electrode via the first contact hole and formed of the lowermost layer of the second conductive layer group;
    a second contact hole passing through the gate insulating film to expose the data link to the data line; wherein the alignment film is positioned within an area sealed by the sealant to be not in contact with the sealant.

2. The device as claimed in claim 1, wherein a storage capacitor is provided by an overlapping of the drain electrode with the common electrode.

3. The device as claimed in claim 1, wherein the common electrode has a plate shape, and the pixel electrode has a rib shape.

4. The device as claimed in claim 1, wherein the second contact hole is formed in an area to be sealed by the sealant.

5. The device as claimed in claim 1, further comprising:
    the alignment film on, the source electrode, the drain electrode, and the pixel electrode.

6. The device as claimed in claim 5, wherein the second contact hole is formed under the alignment film.

7. The device as claimed in claim 1, wherein the semiconductor pattern is formed at a position to be provided with the thin film transistor.

8. The device as claimed in claim 1, wherein each of the first and second conductive layers includes a lowermost layer having a transparent conductive layer and an upper layer having at least one of a single layer formed of a metal material such as Mo, Ti, Cu, AlNd, Al, Cr, a Mo-alloy, a Cu-alloy or an Al-alloy, a double layer and a triple layer formed of Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo-alloy, Mo-alloy/Al, Al-alloy/Mo-alloy, Mo-alloy/Al-alloy, and Mo/Al-alloy.

9. The device as claimed in claim 1, wherein the first conductive group has step coverage having a stepwise shape.

10. The device as claimed in claim 1, wherein the second conductive group has step coverage having a stepwise shape.

* * * * *